United States Patent [19]

Byers et al.

[11] Patent Number: 5,422,915
[45] Date of Patent: Jun. 6, 1995

[54] FAULT TOLERANT CLOCK DISTRIBUTION SYSTEM

[75] Inventors: Larry L. Byers, Apple Valley; Thomas T. Kubista, Eagan; Gregory B. Wiedenman, Woodbury, all of Minn.

[73] Assignee: Unisys Corporation, Blue Bell, Pa.

[21] Appl. No.: 172,661

[22] Filed: Dec. 23, 1993

[51] Int. Cl.$^6$ ............................................. H04L 7/00
[52] U.S. Cl. ..................... 375/357; 375/356; 331/49; 307/65; 327/292; 327/295; 327/258
[58] Field of Search ............. 375/106, 107, 108, 119, 375/118, 10, 109; 307/590, 64, 69, 269, 441; 328/109, 63, 105, 72; 371/7, 8.1, 1; 370/100.1, 16; 340/310 R, 310 A; 331/2, 11, 46, 49

[56] References Cited

U.S. PATENT DOCUMENTS

| | | | |
|---|---|---|---|
| 4,254,492 | 4/1981 | McDermott, III | 375/108 |
| 4,412,342 | 10/1983 | Khan et al. | 375/108 |
| 4,644,498 | 2/1987 | Bedard et al. | 364/900 |
| 4,707,142 | 11/1987 | Baker et al. | 368/46 |
| 4,754,164 | 6/1988 | Flora et al. | 375/107 |
| 4,882,738 | 11/1989 | Suzuki | 375/108 |
| 5,036,528 | 7/1991 | Constantino | 375/119 |

Primary Examiner—Stephen Chin
Assistant Examiner—Tesfaldet Bocure
Attorney, Agent, or Firm—Steven R. Funk; Charles A. Johnson; Mark T. Starr

[57] ABSTRACT

A fault tolerant multiple phase clock distribution system for providing synchronized clock signals to multiple circuit loads. Multiple electrically isolated power domains are powered by redundant AC and DC power sourcing circuits to ensure continued operation upon partial failure of the AC or DC power sourcing circuits. Multiple oscillators from the multiple power domains are synchronized to produce a group of simultaneously synchronized clock signals. Multiple synchronized clock signals from this group are then selected by selection circuitry and selection control circuitry, and are distributed to multiple circuit loads requiring simultaneous synchronization. The oscillator circuitry, synchronization circuitry, selection circuitry, and distribution circuitry is all provided in redundant form, so that the partial failure of any of the circuitry will not result in a system stop. Error recovery circuitry monitors for proper synchronization of the synchronized clock signals, and provides for automatic or manual error recovery upon detection of a synchronization error. A single phase synchronized clock signal is generated to minimize synchronization complexities, and circuitry exists at the circuit loads to generate multiple phase enable signals to emulate a multiple phase clock.

21 Claims, 15 Drawing Sheets

FAULT TOLERANT CLOCK DISTRIBUTION SYSTEM

BACKGROUND OF THE INVENTION

1. Field of the Invention

The present invention relates to fault tolerant clock distribution systems, and more particularly to a clock distribution system which utilizes redundant clock sourcing circuitry, redundant AC and DC power sources, and redundant clock distribution circuitry to ensure continuous clocking of redundant circuit loads.

2. Description of the Prior Art

Modern digital circuitry and computer systems often require the use of synchronous clock distribution systems. Synchronous systems are digital systems where the operations are controlled by continuous, periodic clock pulses. This allows activity within the system to occur at a fixed time relative to the clock pulses.

In electronic circuitry requiring digital synchronous clock signals, it is known to use a plurality of clock sourcing circuits in which a voting method is used to select one of the clock sourcing circuits as the primary clock signal. An example of such a circuit is U.S. Pat. No. 4,644,498, by Bedard et al., issued Feb. 17, 1987. This type of circuit simply has an odd number of identical clock sourcing circuits, each powered by a separate power supply, so that the failure of a minority of the clock sourcing circuits or power supplies will not cause the entire system to fail. These circuits provide a particular circuit load with one clock signal which has been selected by way of the voting scheme.

It is also known to use synchronizing circuitry to synchronize a slave clock signal with a master clock signal so that the triggering edges of any slave clock signal pulses occur at the same time, and will track the frequency of the master clock. Such a circuit is disclosed in U.S. Pat. No. 5,036,528, by Costantino et al., issued Jul. 30, 1991. In the Costantino circuit, the loss of voltage to the master clock will result in the loss of all clock sourcing capability. Phase detection has also been used to determine whether the clock signals are in phase with one another, and if not, the synchronizer resynchronizes the clock signals.

Some digital circuit loads may control or store data which, if lost, would result in catastrophic consequences. For example, a circuit load comprising a dynamic memory would lose all data if the supplying voltage source were to fail or become disconnected. For this reason, the present invention clocks a system which utilizes redundant circuit loads each powered by separate voltage sources, so that the failure of a voltage source does not result in the loss of the system data. Furthermore, the failure of a circuit load itself will not result in the loss of the valuable data, since the redundant circuit load would be storing a duplicate copy of the data. In order to accomplish a redundant circuit load system such as this, a circuit load and its clock sourcing and synchronizing circuitry must be powered by a voltage source which is isolated from the redundant circuit load, clock sourcing circuitry, and synchronizing circuitry. Therefore, a separate clock signal in each "power domain" must clock its associated circuit load so that the loss of the voltage source, the synchronizing circuitry, or the circuit load will not result in the loss of system data. (A "power domain" refers to the circuitry driven by the same voltage source and voltage bus.) These two separate clock signals also need to be synchronized with one another across the power domain boundary so that each circuit load is clocked at precisely the same time in order to maintain the same data or perform the same function in each of the two circuit loads. A single clock source chosen from voting on a number of identical clock sourcing circuits, such as the Bedard patent, would not provide a solution to the problem of simultaneously clocking two circuit loads in separate power domains, since each circuit load must be clocked by a separate clock. A voting scheme simply ensures that the failure of a minority of the clock sourcing circuits will not result in the total loss of the resultant clock signal. The present invention provides redundant clock sourcing circuits, each of which are powered by separate voltage sources, in order to simultaneously clock multiple circuit loads which are also powered by separate voltage sources. This allows continued system performance in the event of a clock source failure or a circuit load failure.

Furthermore, a single synchronizer which synchronizes an incoming clock signal with a local clock, such as the Costantino patent, is not acceptable in a system which utilizes fully redundant power domains. In the system being clocked by the present invention, a separate synchronizer is required in each power domain which synchronizes the clock signal from its power domain with those clock signals from other power domains. This ensures that one clock signal will clock its respective circuit load at precisely the same time as the other clock signals clock their respective loads. Therefore, the failure of a circuit load will not result in a catastrophic loss of data, since a separate clock signal had been ensuring simultaneous activity in a redundant circuit load prior to the failure of the defective circuit load.

The present invention provides such redundant synchronization across multiple power domain boundaries, and provides redundancy of clock signals to redundant circuit loads byway of dual synchronized clock signals rather than by voting upon a majority of identical clock signals, or by synchronizing with a local clock. This invention was driven by the need for higher reliability through the use of a clock distribution system which can simultaneously provide clock drive to redundant, individually powered circuit loads. The present invention also provides redundancy in clock signal connections to their respective circuit loads, so that the disconnection of a connection does not deprive the circuit load of clock signals.

In order to make such a fully redundant clock distribution system complete, detection of clock signal errors is required. The present invention provides skew fault detection to monitor and control each of the redundant clock signals, and allow an operational clock signal to replace a faulty clock signal without any data corruption at the circuit load. This redundancy in clock distribution, coupled with the capability to clock redundant circuit loads, results in a digital system which can remain completely operational even in light of multiple failures.

OBJECTS

It is a primary objective of this invention to provide an improved clock distribution system.

It is another object of the present invention to provide a clock distribution system with high redundancy and fault tolerance.

It is another object of the present invention to provide multiple power domains, with clock sourcing capabilities in each power domain, to prevent the loss of clock sourcing capabilities upon failure of the power source to that power domain's clock source circuitry.

It is another object of the present invention to provide redundant AC and DC power sourcing capabilities, to ensure continuous operation upon the loss of AC or DC power sourcing circuitry.

It is yet another object of the present invention to provide each duplicate circuit load in a circuit load group with a separate and electrically isolated clock signal that is synchronized with the remaining clock signals that clock redundant circuit loads in their respective circuit load groups.

It is still another object of the invention to provide redundant clock selection and distribution circuitry to select and distribute a clock signal even though a partial failure of the selection circuitry or the distribution circuitry has occurred.

It is also an object of the present invention to provide expansion capabilities for the circuit load groups such that additional circuit loads may be simultaneously clocked by the same clock sourcing circuitry.

It is another object of the present invention to provide synchronization circuits in each power domain to synchronize the clock signal in its power domain with the clock signal from the other power domains, in order to ensure fault tolerance and simultaneous clocking of the redundant circuit loads.

It is a further object of the present invention to provide a single phase clock beyond the point of synchronization of the redundant clock signals to simplify clock signal distribution and skew control, minimize synchronization circuitry, and generate multiple phases of the clock signal at the circuit loads themselves.

It is another object of the present invention to provide clock signal error protection, to allow for automatic or manual clock signal switching upon detection of an error.

Other more detailed objectives will become apparent from a consideration of the Drawings and the Detailed Description of the Preferred Embodiment.

SUMMARY OF THE INVENTION

The invention is a fault tolerant clock distribution system for use in systems requiring redundant synchronized clock signals to clock multiple circuit loads. High fault tolerance is provided through the use of redundant oscillators, phase detection and synchronization circuitry, clock distribution circuitry, and AC and DC power sources. Error detection circuitry is provided to allow automatic or manual recovery from synchronization errors, and selection circuitry is used to switch from a faulty clock signal to an operational clock signal. The present invention generates a single phase clock signal, and provides multiple phase enable signals at the circuit loads, in order to elude the complex synchronization and distribution of multiple clock phases. The combination of these elements creates a very fault tolerant, relatively skew-free multiple phase clock distribution system.

In accordance with one aspect of the invention, the apparatus utilizes multiple power domains, which are powered by separate DC power sources. Clock sourcing circuitry is included within each power domain to provide a digital oscillator signal in each power domain. This digital oscillator signal is then synchronized with each of the digital oscillator signals from each of the other power domains in the system. Therefore, each power domain will have a digital oscillator signal which is synchronized with all other digital oscillator signals, and these signals are referred to as synchronized clock signals. Each power domain also includes clock signal distribution circuitry to distribute the synchronized clock signal within its power domain to circuit loads within the same power domain. Each of the synchronized clock signals can clock the circuit load within its power domain at the same time as the synchronized clock signals from other power domains clock their respective circuit loads. Therefore, activity within each of the circuit loads in each of the power domains will occur simultaneously, and any data which is stored in the circuit load of one power domain will be equivalent to that which is stored on the other power domains.

In order to ensure continuous operation in the event of a power failure, multiple levels of power sourcing redundancy are used in the present invention. Each power domain is powered by a separate DC power source. If a DC power source associated with one of the power domains were to fail, the other power domains would continue operating due to the presence of independent DC power source circuitry within each power domain. In order to further increase DC power source reliability, another aspect of the present invention contains multiple DC power supplies in each DC power source. Each of these DC power supplies is connected in parallel to concurrently power their associated power domain. In this way, the failure of one of the DC power supplies will not cause the DC power source associated with that power domain to become ineffective. The power redundancy of the present invention is further enhanced in another aspect of the present invention through the use of redundant AC power sources. A separate AC power source is used to provide AC power to each of the DC power supplies within each DC power source. For instance, if two DC power supplies are used within each DC power source, two AC power sources will be used, and one of the DC power supplies in each DC power source will be driven by a first AC power source, and the other DC power supplies in each DC power source will be driven by a second AC power source. Therefore, if either AC power source fails, the other AC power source will continue to provide AC power to one power supply within each DC power source, and none of the DC power sources will cease to supply DC power.

In accordance with another aspect of the invention, oscillator signals within each power domain are synchronized with one another to produce a group of synchronized clock signals. Where redundant oscillators are used in each power domain, and each is synchronized with each of the oscillators in the remaining power domains, a group of simultaneously synchronized clock signals is available to be selected to drive a number of circuit loads. Any number of these synchronized clock signals can be selected to provide synchronized clocking to the circuit loads. If two redundant circuit loads were to be clocked, two of the synchronized clock signals can be selected by selection circuitry to clock each of the redundant circuit loads simultaneously. In order for the selection circuitry to select the appropriate synchronized clock signals, selection control circuitry is required, which designate which of the synchronized clock signals is to be selected to simultaneously clock the redundant circuit loads. The selection control circuitry of the present invention allows the automatic selection of synchronized clock signals, or manual selection through a user interface to select the desired synchronized clock signals to clock the circuit loads.

To provide a high level of security from circuitry failure, multiple clock distribution circuits are provided. Each clock distribution circuit receives a synchronized clock signal which has been selected to clock a circuit load, and provides the necessary clock drive capabilities to clock the circuitry within that circuit load. If one clock distribution circuit fails, the other synchronized clock signals will be distributed through the remaining clock distribution circuits, and the circuit loads associated with those clock distribution circuits will continue to be clocked. If all circuit loads being clocked are redundant circuit loads, the loss of one clock distribution circuit will not result in data loss, since each of the redundant circuit loads would contain the same data, and the remaining clock distribution circuits will continue to properly provide the remaining redundant circuit loads with valid clock signals.

The selection circuitry also includes redundancy. In accordance with yet another aspect of the invention, each synchronized clock signal can be selected through at least two different selection circuits. Therefore, if one selection circuit fails, the selection control circuitry can still select the desired synchronized clock signal through the remaining operational selection circuit. Each clock distribution circuit therefore requires multiple inputs to receive the desired synchronized clock signal from each of the redundant selection circuits providing the desired synchronized clock signal. From these multiple inputs, the clock distribution circuitry then chooses one of the identical synchronized clock signals from one of these inputs as the driving clock signal, and disregards the other synchronized clock signals at the remaining inputs. If the selection circuit providing a synchronized clock signal to the chosen input of the clock distribution circuitry fails, the clock distribution circuitry will automatically switch to one of its remaining inputs to receive the same synchronized clock signal from another redundant selection circuit. In order to perform this input switch, the clock distribution circuitry must monitor the synchronized clock signal at each of its inputs, and a multiplexer will select which of the synchronized clock signals should drive the circuit loads.

Yet another aspect of the present invention includes skew detection circuitry to ensure proper synchronization of the synchronized clock signals. If the skew detection determines that two synchronized clock signals are not maintaining proper synchronization, the skew detection circuitry will notify the selection control circuitry to select different synchronized clock signals by sending the appropriate control signals to the selection circuitry. This provides continuous clocking of the circuit loads although a synchronized clock signal error has occurred.

Another aspect of the present invention provides for the clocking of the circuit loads at different phases of the selected synchronized clock signal. It is desirable to allow the capability to clock the circuit loads on selected pulses of the synchronized clock signal, but the use of multiple oscillators in each power domain would create a very complex distribution situation if multiple phases of the oscillator signals were generated and distributed to the circuit loads. Rather than first generating multiple phases of the clock signals and distributing each phase to each load, only one clock signal needs to be distributed to each circuit load. Upon receipt of this single phase synchronized clock signal at the circuit loads, multiple phase enable circuitry exists which will "enable" the single phase synchronized clock signal to clock the circuit load on specified pulses of the single phase synchronized clock signal. Therefore, the synchronized clock signal provides the clock triggering pulses for all circuit loads in its associated power domain, and each circuit load generates enable signals to enable or disable each circuit within the circuit load to receive or disregard these clock triggering pulses.

This highly redundant multiple phase clock distribution system is very beneficial in systems requiring continuous operation. The redundancy in power systems, clock sourcing and synchronization, and clock distribution allow the system to continue to operate properly where a failure has occurred. This fault tolerant clock distribution system is particularly advantageous where redundant circuit loads are utilized in order to ensure that no data loss occurs. The system provides automatic or manual error recovery, and provides for flexibility in circuit load design through the use of multiple phase enable signals.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE PREFERRED EMBODIMENT

Figure 1:
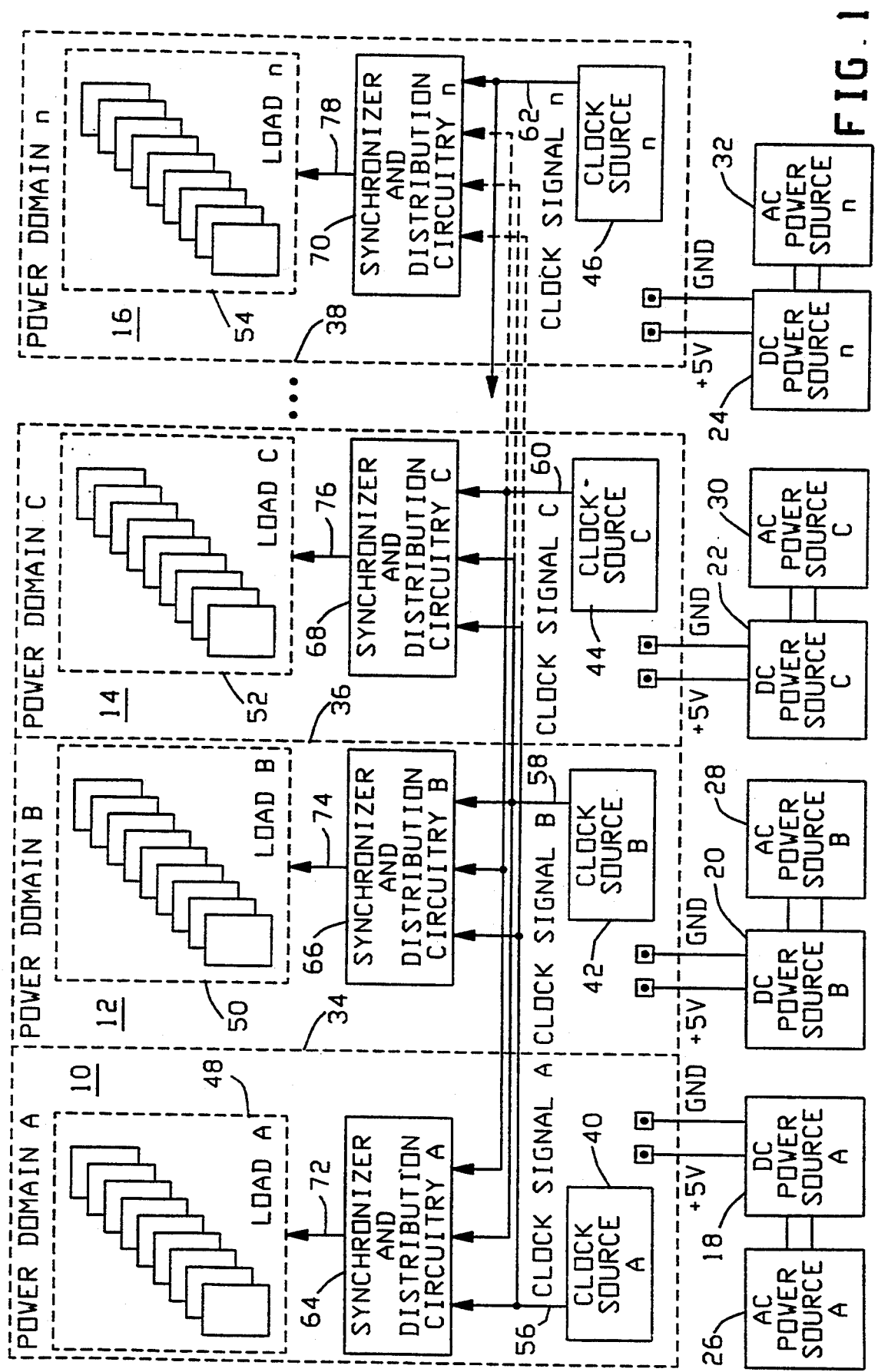
FIG. 1 is a block diagram of a clock distribution system where a plurality of clock sources powered by separate voltage busses are synchronized across the power domain boundaries in order to simultaneously clock an equal number of equivalent circuit loads.

FIG. 1 is a block diagram of a clock distribution system where a plurality of clock sources powered by separate voltage busses are synchronized across the power domain boundaries in order to simultaneously clock an equal number of equivalent circuit loads. This block diagram illustrates the purpose of the clock distribution redundancy, wherein n (n=any number greater than 1) equivalent loads storing identical copies of data are clocked simultaneously by clock sources in separate power domains in order to maintain equivalency of load data, and ensure that no single AC or DC power failure will result in the loss of data. From this diagram, it can be seen that additional clock sources may be added in additional power domains, and the original clock signals can then be synchronized with the additional clock signals to simultaneously clock as many loads as necessary (n loads) to obtain the desired assurance that power failures or clock source failures will not cause any loss of data.

In FIG. 1, Power Domain A 10, Power Domain B 12, Power Domain C 14, and Power Domain n 16 are powered by separate DC Power Sources (DC power supplies in the preferred embodiment), and each power domain represents a completely isolated voltage bus. DC Power Source A 18 supplies DC voltage to the circuitry in Power Domain A, DC Power Source B 20 supplies DC voltage to the circuitry in Power Domain B, DC Power Source C 22 supplies DC voltage to the circuitry in Power Domain C, and DC Power Source n 24 supplies DC voltage to the circuitry in Power Domain n. Any voltage could be used to supply power to the power domains, depending on the component logic family preferred. In the preferred embodiment, the DC Power Sources supply +5 volts DC to their respective power domains. Each of the DC power sources is powered by an AC power source, labelled AC Power Source A 26, AC Power Source B 28, AC Power Source C 30, through AC Power Source n 32. It would be an option to reduce the number of independent AC power sources from one per power domain to at least one AC power source. This depends on the desired AC power source redundancy required for the particular application. For instance, where three power domains are utilized, it would be possible to provide AC power to the three DC power sources through only two AC power sources. In that case, two of the DC power sources would be powered by a single AC power source.

Power Domain A 10 and Power Domain B 12 are separated by the Power Domain Boundary A/B 34, Power Domain B and Power Domain C 14 are separated by the Power Domain Boundary B/C 36. Power Domain n 16 would be separated from Power Domain n−1 by the Power Domain Boundary n/n−1 38, which is dependent upon the number of independent power domains chosen. These boundaries physically isolate the voltage bus of one power domain from the voltage bus of an adjacent power domain. Within each power domain, clock sourcing circuitry exists which provides an oscillatory digital clock signal. Clock Source A 40 resides in Power Domain A, Clock Source B 42 resides in Power Domain B, Clock Source C 44 resides in Power Domain C, and so forth through Clock Source n 46 in Power Domain n. Since each clock source circuit is powered by an isolated voltage bus, redundant clock source circuits will remain operative if either the AC power source or DC power source supplying voltage to the one clock source circuit fails or becomes inoperative. For example, if the power supply/power supplies comprising DC Power Source A was/were to fail, causing the clock signal of Clock Source A to stop operating, Clock Source B, Clock Source C, and all clock sources through Clock Source n 46 would be unaffected, and would continue to supply clock signal to its load. The system could continue operations, and the data which was lost in Load A 48 of Power Domain A will have already been preserved in Load B 50 of Power Domain B, Load C 52 of Power Domain C, and through Load n 54 of Power Domain n, since the same data that was manipulated in Load A prior to the failure of DC Power Source A was simultaneously manipulated in Load B, Load C, and through Load n. Therefore, no data loss will occur since only one of the n copies of data lost its DC power source.

The use of redundant power domains, redundant circuit loads, and redundant clock distribution circuitry allows each load to have the same information clocked in at the same time. In order that each load in each power domain maintains the same information, the information or data sent to each load must be clocked at precisely the same time. To ensure that each load is clocked simultaneously, the clock signal from Clock Source A 40 is synchronized with the clock signals from Clock Source B 42, Clock Source C 44, through Clock Source n 46. These clock signals will be referred to as Clock Signal A 56, Clock Signal B 58, Clock Signal C 60, through Clock Signal n 62. Synchronizer & Distribution Circuitry A 64, B 66, C 68, and n 70 in Power Domain A, B, C, and[n respectively, performs the synchronization of the clock signal in a given power domain with those clock signals from the remaining power domains.

Synchronization of the clock signals is performed across the Power Domain Boundaries A/B 34, B/C 36, through n/n−1 38. The Synchronizer & Distribution Circuitry detects phase differentials between n clock signals, resynchronizes the clock signals, and distributes the Synchronized Clock Signal A 72, B 74, C 76, and n 78 to Load A 48, B 50, C 52, and n 54 respectively. In the preferred embodiment, each load comprises equivalent memory and memory control circuitry. All of the information which is clocked into one load is also being simultaneously clocked into the other loads. In this way, the loss of voltage in any power domain will only affect the information stored in that power domain's load, and the other loads will continue to store valid data. Since each load had identical information simultaneously clocked into it prior to the loss of power to one power domain, the remaining power domain's load will hold all of the previous data, plus any new data which is then clocked into it.

Figure 2:
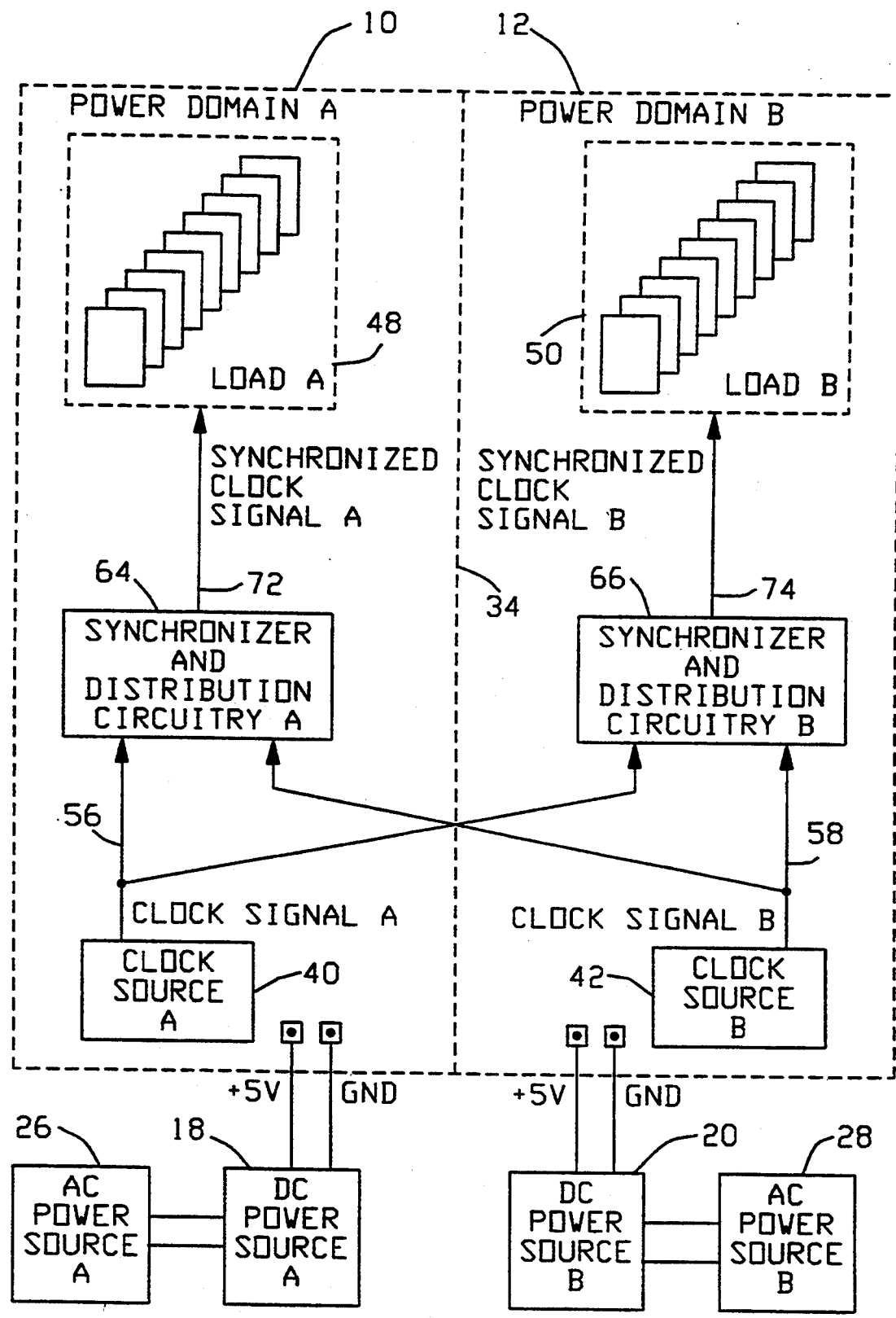
FIG. 2 is a block diagram of the preferred embodiment of the Fault Tolerant Clock Distribution System.

FIG. 2 is a block diagram of the preferred embodiment of the Fault Tolerant Clock Distribution System. In the preferred embodiment, only two power domains were necessary to obtain the desired reliability. Put another way, the number of power domains (n) of FIG. 1 equals two. The power domains are labelled Power Domain A 10 and Power Domain B 12. Power Domain A is powered from AC Power Source A 26, and DC Power Source A 18 which consists of one or more DC power supplies. Similarly, Power Domain B 12 is powered from AC Power Source B 28 and DC Power Source B 20.

Looking first to Power Domain A, Clock Signal A 56 from Clock Source A 40, and Clock Signal B 58 from Power Domain B's 12 Clock Source B 42, are inputs to Synchronizer & Distribution Circuitry A 64. The Synchronizer & Distribution Circuitry detects phase differentials between Clock Signals A and B, adjusts Clock Signal A if the two clock signals are not properly synchronized, and distributes the Synchronized Clock Signal A 72 to Load A 48. Synchronized Clock Signal A consists of Clock Signal A 56 which has been adjusted to be synchronized with Clock Signal B 58. Looking now to Power Domain B, Clock Signal B from Clock Source B, and Clock Signal A from Power Domain A's Clock Source A, are inputs to Synchronizer & Distribution Circuitry B 66, which detects phase differentials between Clock Signals B and A, adjusts Clock Signal B if the two clock signals are not properly synchronized, and distributes the Synchronized Clock Signal B 74 to Load B 50. Therefore, Synchronized Clock Signal B is Clock Signal B 58 which has been adjusted to be synchronized with Clock Signal A 56. By simultaneously synchronizing each clock signal with the other, Load A and Load B will be clocked at precisely the same time.

In the preferred embodiment, Load A 48 and Load B 50 comprise equivalent memory and memory control circuitry. All of the information which is clocked into one load is also being simultaneously clocked into the other load. In this way, the loss of voltage in either power domain will only affect the information stored in that power domain's load, and the other load will continue to store valid data. Since each load had identical information simultaneously clocked into it prior to the loss of power to one power domain, the remaining power domain's load will hold all of the previous data, plus any new data which is then clocked into it. Furthermore, if any other circuitry within a given power domain fails so that its synchronized clock signal can not properly clock its load, another entire power domain exists along with associated clock sourcing capabilities so that the system can continue to operate or gracefully recover, depending on the specific failure which occurred and the mode of operation that the system is operating under. A more detailed description of error detection and recovery for the clock distribution system is provided in a later portion of this description.

Figure 3:
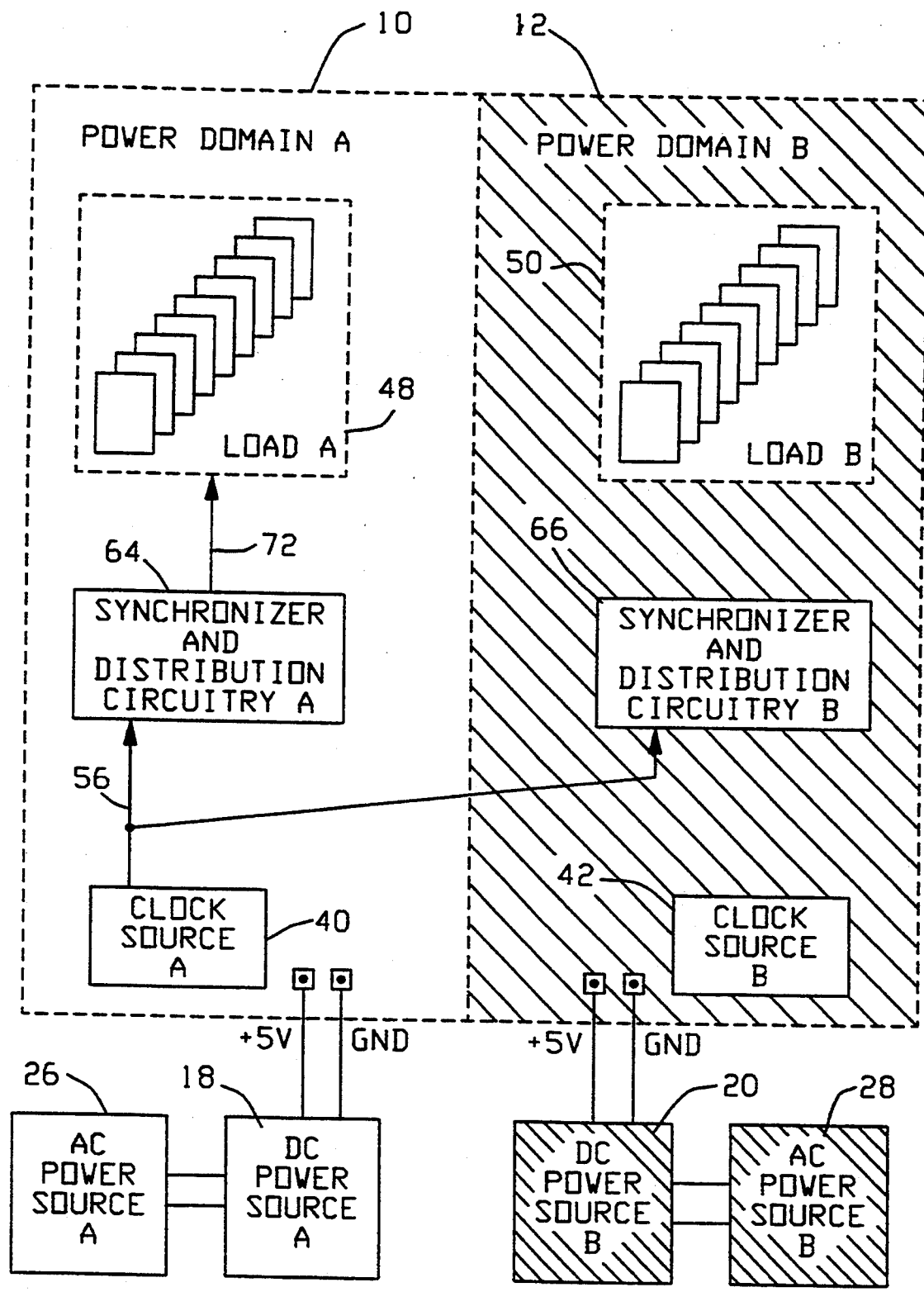
FIG. 3 shows the Fault Tolerant Clock Distribution System when DC Power Source B or AC Power Source B has failed.

FIG. 3 shows the Fault Tolerant Clock Distribution System when DC Power Source B 20 or AC Power Source B 28 has failed. When DC Power Source B or AC Power Source B fails, the voltage to Power Domain B 12 is no longer present on the voltage bus to supply the circuitry. None of the circuitry in Power Domain B will be operational in such a case. In this case, Clock Source A 40 will continue to provide clock signals to Load A 48 through Synchronization & Distribution Circuitry A 64 even though Power Domain B has failed. Since the data which was stored in Load B 50 was simultaneously stored in Load A, the data is not lost as a result of the loss of voltage to Power Domain B. A similar situation exists where DC Power Source A 18 or AC Power Source A 26 fails, in which case the circuitry of Power Domain B will remain operational. If a larger degree of reliability was desired, and an additional power domain and associated circuitry were being used (i.e., Power Domain C 14 of FIG. 1), two power domains would remain operational upon the loss of one power domain. In that case, two failures in two different power domains could occur without losing valuable system data or error recovery capability.

Figure 4:
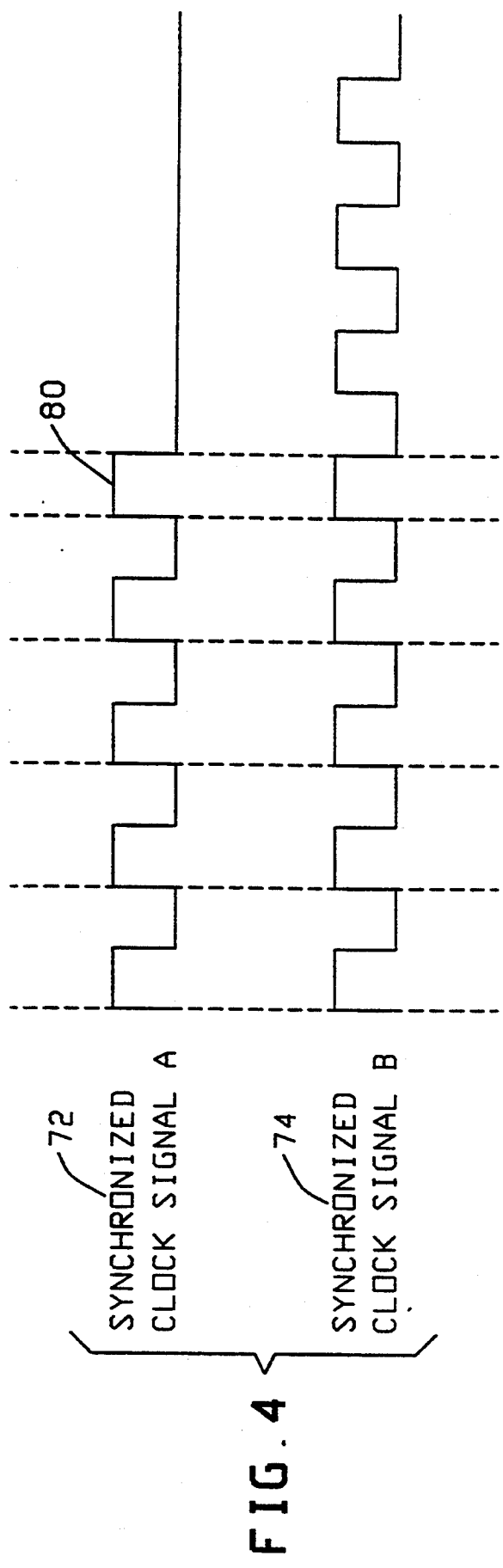
FIG. 4 is a waveform diagram which shows the Synchronized Clock Signals which supply each load, and which further illustrates how the Synchronized Clock Signal in a given power domain continues to clock its respective load upon the loss of the other Synchronized Clock Signal.

FIG. 4 is a waveform diagram which shows the Synchronized Clock Signals which supply each load, and which further illustrates how the Synchronized Clock Signal in a given power domain continues to clock its respective load upon the loss of the other Synchronized Clock Signal. As previously described, if DC Power Source A 18 was to fail, Clock Source A 40 would stop producing Clock Signal A 56, which would result in the loss of Synchronized Clock Signal A 72, and Load A 48 would no longer receive clock signals. FIG. 4 depicts the loss of Synchronized Clock Signal A 72 at the falling edge of Pulse 80, but shows that Synchronized Clock Signal B 74 will remain operative to clock Load B 50. This is because each Clock Source circuit is powered by separate DC Power Sources. A similar scenario can be envisioned where Synchronized Clock Signal B 74 stopped functioning and Synchronized Clock Signal A 72 continued operating.

Figure 5:
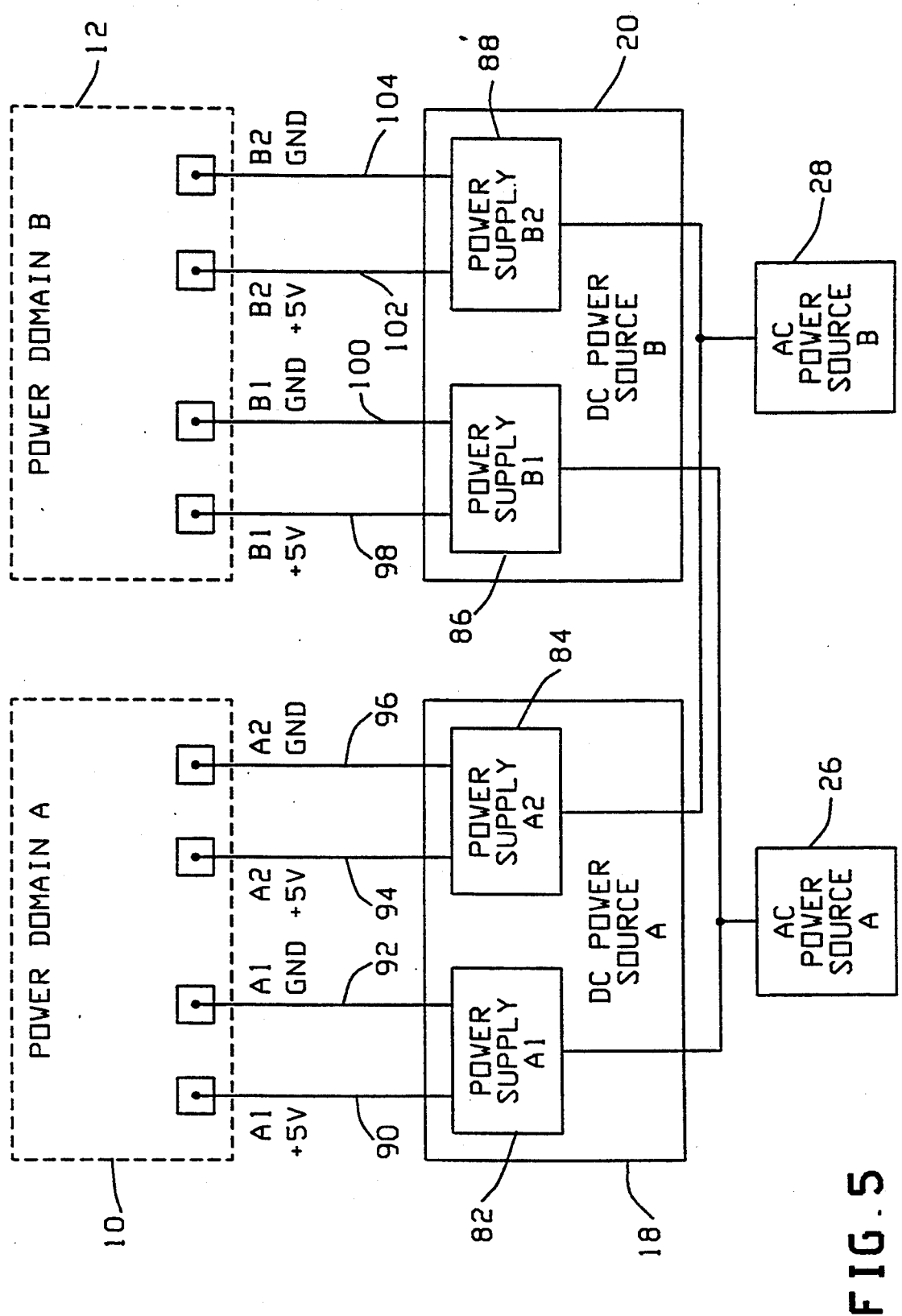
FIG. 5 illustrates the AC power source and DC power source redundancy of the preferred embodiment.

FIG. 5 illustrates the AC power source and DC power source redundancy of the preferred embodiment. To provide an extra level of security against voltage loss, redundant power supplies are used in each DC power source. Power Supply A1 82 and Power Supply A2 84 reside in DC Power Source A 18, and Power Supply B1 86 and Power Supply B2 88 reside in DC Power Source B 20. Power Supply A1 82 connects to Power Domain A 10 through A1 +5 V 90 and A1 GND 92. Power Supply A2 84 connects to Power Domain A 10 through A2 +5 V 94 and A2 GND 96. Power Supply B1 86 connects to Power Domain B 12 through B1 +5 V 98 and B1 GND 100. Power Supply B2 88 connects to Power Domain B 12 through B2 +5 V 102 and B2 GND 104. If either power supply fails within DC Power Source A or DC Power Source B, the remaining power supply can supply enough current to keep the circuitry of the power domain operative. When both power supplies are operative, the power supplies share current, and both provide current to the power domain. A higher number of redundant power supplies could be used if a higher degree of DC power reliability was desired; however, dual power supplies in each DC power source provided the requisite reliability in the preferred embodiment due to the low failure rate of the power supplies implemented.

Each of the AC power source outputs is connected to one power supply in DC Power Source A 18 and B 20. AC Power Source A 26 provides AC power to Power Supply A1 82 and Power Supply B1 86. AC Power Source B 28 provides AC power to Power Supply A2 84 and Power Supply B2 88. In this way, a failed AC power source will only affect one power supply in each DC power source, and the other power supply in each DC power source will remain operational. For example, if AC Power Source A 26 fails, Power Supply A1 and Power Supply B1 will lose AC input power, and will stop producing a +5 volt DC output. However, AC Power Source B 28 would still be producing AC power, and Power Supply A2 and Power Supply B2 would continue to provide the +5 volt DC voltage to Power Domain A and Power Domain B. Similarly, if AC Power Source B 28 fails, only Power Supply A2 and Power Supply B2 would stop producing +5 volts, and Power Supply A1 and Power Supply B1 would still be fully operational. The AC Power Source used in the preferred embodiment consists of using either utility AC power or diesel generator power, one of which will be selected through the use of an uninterruptable power source. However, it must be appreciated that any other type of AC power source would serve as well, such as motor/alternator AC power sources and the like.

Figure 6A:
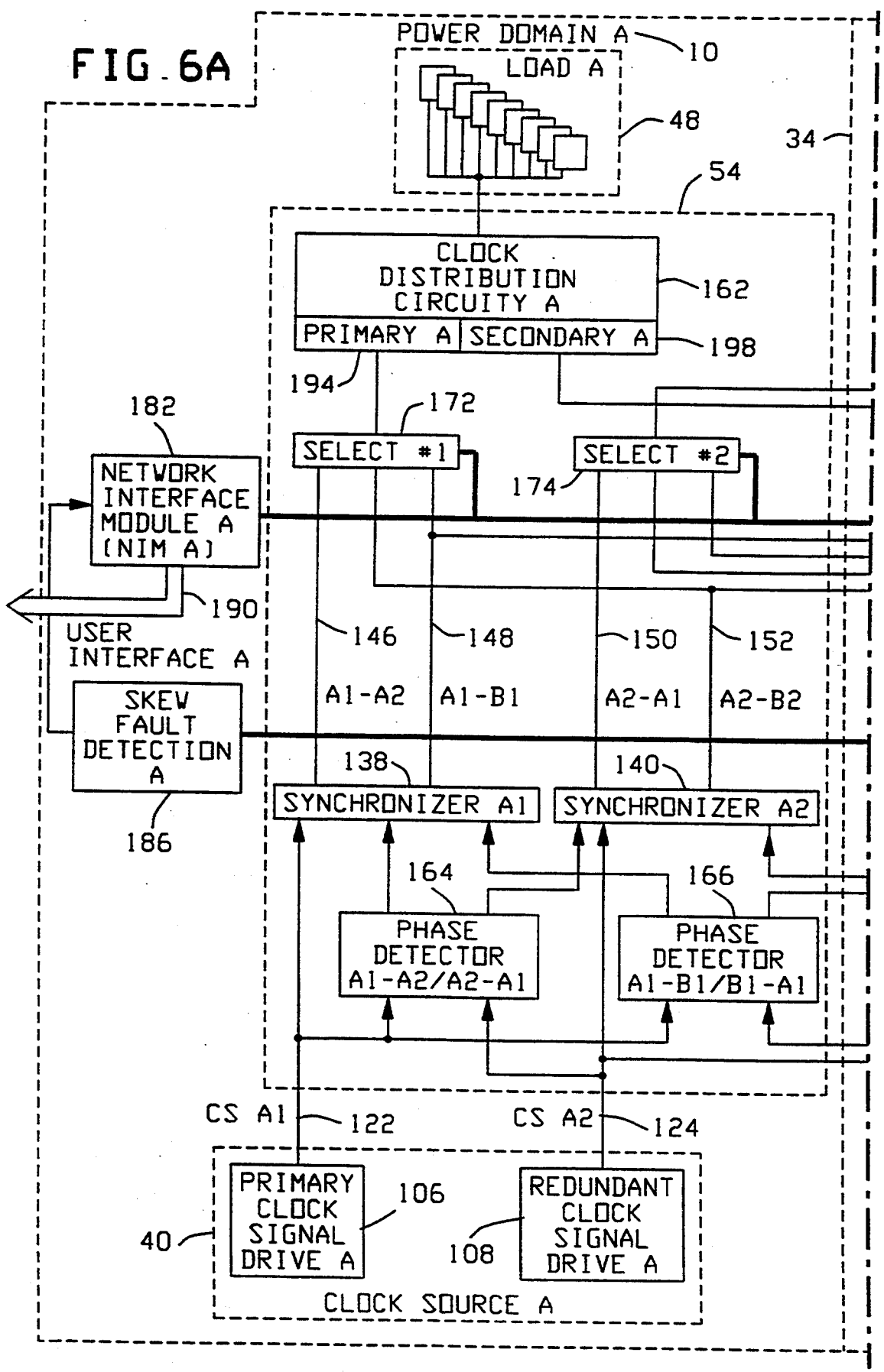
FIG. 6 includes FIG. 6A and FIG. 6B positioned as shown, and illustrates a complete composite block diagram showing the detail of the preferred embodiment.
Figure 6B:
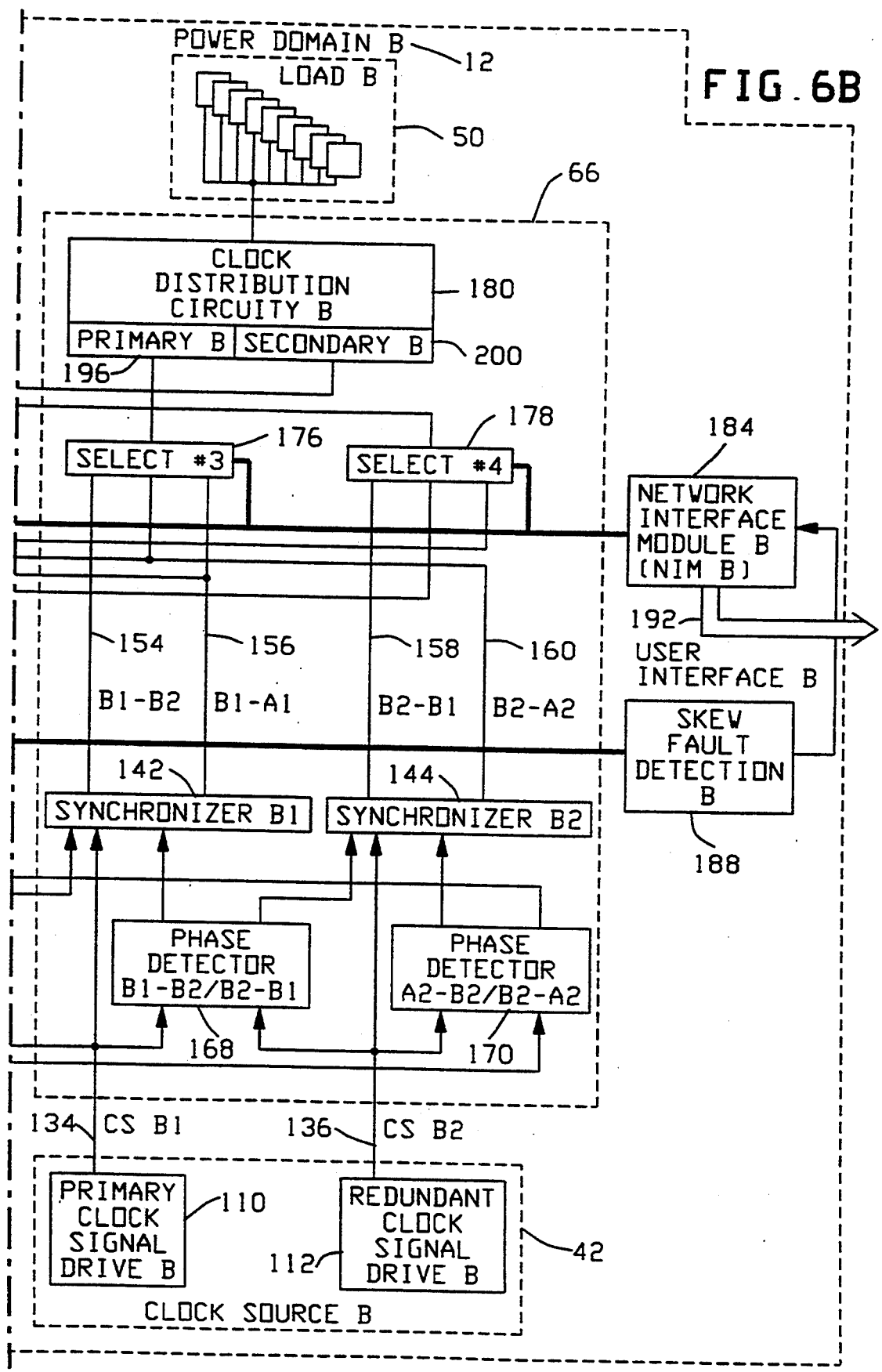

FIG. 6 includes FIG. 6A and FIG. 6B positioned as shown, and illustrates a complete composite block diagram showing the detail of the preferred embodiment. As FIG. 2 previously showed, each power domain consists of clock sourcing capabilities, synchronization and distribution circuitry, and recipient load circuitry. FIG. 6 shows that two Clock Signals exist in each Clock Source A 40 and B 42. Clock Source A consists of Primary Clock Signal Drive A 106 and Redundant Clock Signal Drive A 108, and Clock Source B consists of Primary Clock Signal Drive B 110 and Redundant Clock Signal Drive B 112. The Primary Clock Signal Drives provide the default clock signal, and the Redundant Clock Signal Drives provide the clock signal which can be selected upon a failure of the Primary Clock Signal Drive.

Figure 7:
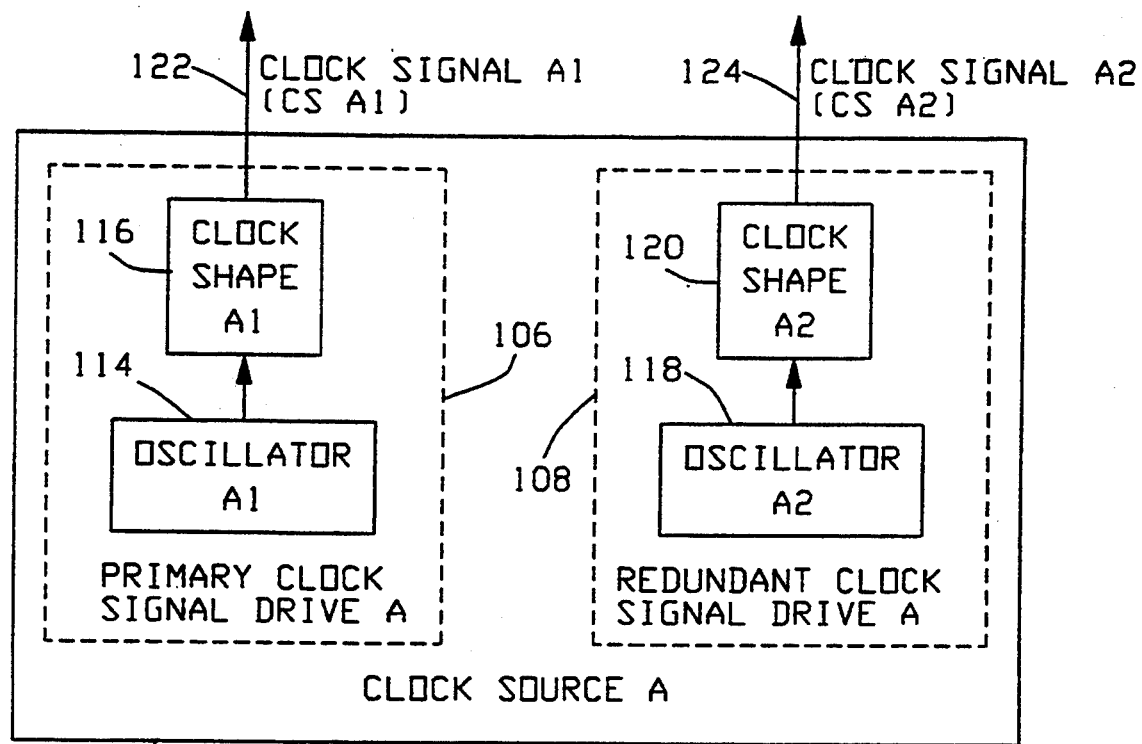
FIG. 7 is a block diagram of Clock Source A in Power Domain A.

FIG. 7 is a block diagram of Clock Source A 40 in Power Domain A 10. The Primary Clock Signal Drive A 106 contains Oscillator A1 114 and Clock Shape A1 116, and the Redundant Clock Signal Drive A 108 contains Oscillator A2 118 and Clock Shape A2 120. Each oscillator produces a digital clock signal which is connected to the Clock Shape circuitry. The Clock Shape circuitry is included to produce a symmetric clock pulse with a 50% duty cycle, which creates more pronounced triggering edges, and allows inverted clock signals to be utilized. Clock Signals A1 122 and A2 124 of Clock Shape A1 116 and A2 120 are the clock signals of which one will be synchronized with a clock signal from Power Domain B 12. Clock signal A1 122 and Clock Signal A2 124 are species of the generic Clock Signal A 56 depicted in FIGS. 1, 2, and 3.

Figure 8:
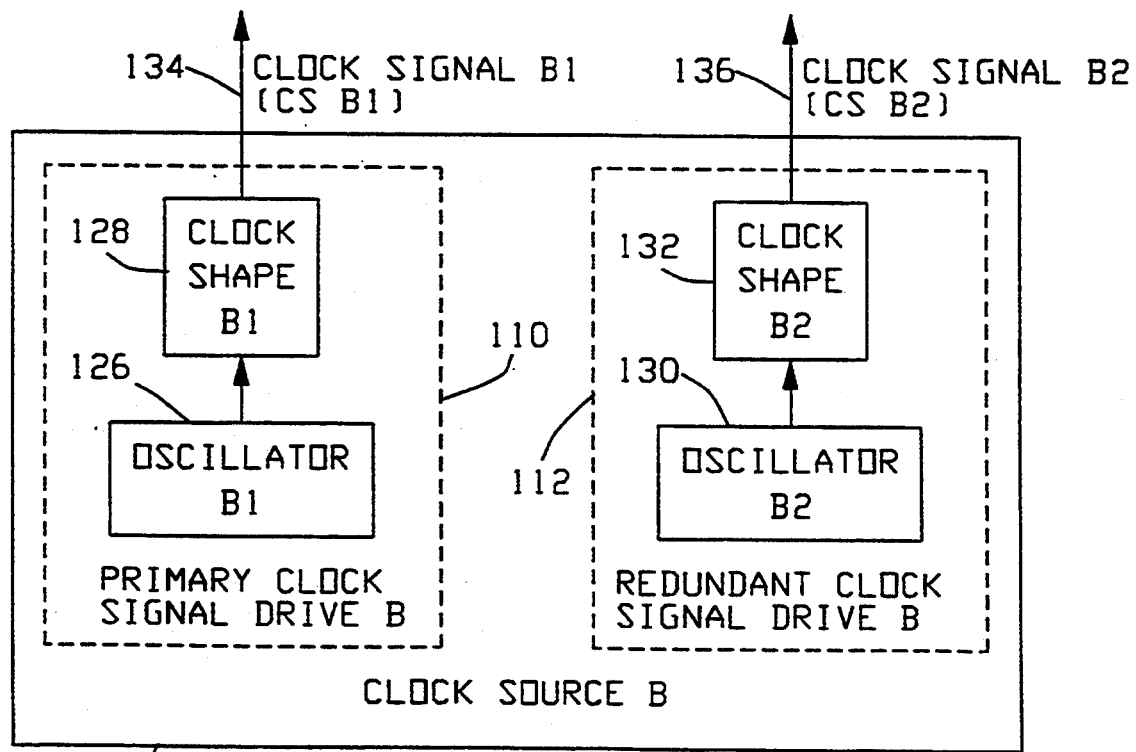
FIG. 8 is a block diagram of Clock Source B in Power Domain B.

FIG. 8 is a block diagram of Clock Source B 42 in Power Domain B 12. The Primary Clock Signal Drive B 110 contains Oscillator B1 126 and Clock Shape B1 128, and the Redundant Clock Signal Drive B 112 contains Oscillator B2 130 and Clock Shape B2 132. The function of Clock Source B 42 is analogous to that of Clock Source A 40 described above. Clock Signals B1 134 and B2 136 of Clock Shape B1 128 and B2 132 are the clock signals of which one will be synchronized with a clock signal from Power Domain A 10. Clock signal B1 134 and Clock Signal B2 136 are species of the generic Clock Signal B 58 depicted in FIGS. 1, 2, and 3.

Returning to FIG. 6, Clock Signals A1 122, A2 124, B1 134, and B2 136 are connected to Synchronizers A1 138, A2 140, B1 142, and B2 144 respectively. A Synchronizer will resynchronize its associated Clock Signal with another Clock Signal that clocks the load in the other power domain. The synchronizers resynchronize the Clock Signal upon a request from a phase detector, which monitors the phase differential between two given Clock Signals. The four Clock Signals, Clock Signal A1 138, Clock Signal A2 124, Clock Signal B1 134, and Clock Signal B2 136, are synchronized with each other in various combinations of "clock pairs". A clock pair is a synchronized pair of Clock Signals, where each of the two resulting Synchronized Clock Signals clocks a load in one of the two power domains. Therefore, two of the four Clock Signals are selected as the "active" signals, and each will clock one of the loads in a power domain. These two clock signals are synchronized with each other before clocking its respective load so that the loads are guaranteed to perform functions at precisely the same time. The remaining two Clock Signals (the two of the four which were not selected as the active signals) are "inactive" in the sense that they will not be currently clocking a load.

Four different pairs of Clock Signals are simultaneously synchronized in the preferred embodiment. Those Synchronized Clock Signals comprise four sets of clock pairs: 1) Synchronized Clock Signal A1-A2 146 and Synchronized Clock Signal A2-A1 150, 2) Synchronized Clock Signal A1-B1 148 and Synchronized Clock Signal B1-A1 156, 3) Synchronized Clock Signal A2-B2 152 and Synchronized Clock Signal B2-A2 160, and 4) Synchronized Clock Signal B1-B2 154 and Synchronized Clock Signal B2-B1 158. It should be noted that two of these clock pairs comprise pairs of Synchronized Clock Signals within the same power domain: Synchronized Clock Signal A1-A2 and Synchronized Clock Signal A2-A1, and Synchronized Clock Signal B1-B2 and Synchronized Clock Signal B2-B1. The reason for providing these clock pairs is to allow for the replacement of circuitry within one power domain while allowing the circuit loads associated with that power domain to continue to be clocked by the circuitry of the other power domain. For example, if the circuitry within Clock Source B 42 was to fail, Synchronized Clock Signal A2-A1 150 could clock Load B 50. Therefore, if Clock Source B 42 was on a separate printed circuit board, as in the preferred embodiment, this board can be replaced without having to discontinue clock signals to Load B 50. However, if Power Domain B 12 was never powered up, Synchronized Clock Signal A1-A2 146 would clock Load A 48 by itself, and Synchronized Clock Signal A2-A1 150 would not be used. Although Synchronized Clock Signal A2-A1 could have been used as a redundant signal for Load A 48, it was not used as such in the preferred embodiment because it was determined that Power Domain B 12 would always be used, and it would be powered up immediately following the application of power to Power Domain A 10. In the preferred embodiment, the very short time between application of power to Power Domain A and the application of power to Power Domain B did not justify the need for supplying Synchronized Clock Signal A2-A1 150 to the Secondary A 198 input for redundancy. Therefore, although the active clock pair will be the clock pair comprising Synchronized Clock Signal A1-A2 146 and Synchronized Clock Signal A2-A1 150 at system power up, only Synchronized Clock Signal A1-A2 146 will be clocking Load A 48. When Power Domain B 12 is then powered up, the system will choose a Clock Signal from each Power Domain to clock its respective load. For example, when Power Domain B is powered up, the clock pair comprising Synchronized Clock Signal A1-A2 146 and Synchronized Clock Signal A2-A1 150 will be aborted, and the clock pair comprising Synchronized Clock Signal A1-B1 148 and Synchronized Clock Signal B1-A1 156 will be selected. This description applies by analogy if Power Domain B 12 were powered up before Power Domain A 10.

A unique phase detector is assigned to each of these four sets of Clock Signals. Phase Detector A1-A2/A2-A1 164 monitors for phase differences between Clock Signal A1 122 and Clock Signal A2 124. If Phase Detector A1-A2/A2-A1 establishes that Clock Signal A1 is leading Clock Signal A2, it will send a signal to Synchronizer A1 138 to delay for a short time to resynchronize Clock Signal A1 with Clock Signal A2. If Phase Detector A1-A2/A2-A1 determines that Clock Signal A2 is leading Clock Signal A1, it will send a signal to Synchronizer A2 140 to delay for a short time to resynchronize Clock Signal A2 with Clock Signal A1. A similar scenario occurs with the remaining three sets of Clock Signals and their associated phase detectors. Phase Detector A1-B1/B1-A1 166 monitors Clock Signal A1 and Clock Signal A2, and sends a signal to Synchronizer A1 138 or Synchronizer B1 142 if necessary to delay the clock signal which is leading the other. Phase Detector B1-B2/B2-B1 168 monitors Clock Signal B1 and Clock Signal B2, and sends a signal to Synchronizer B1 142 or Synchronizer B2 144 if necessary to delay the clock signal which is leading the other. Finally, Phase Detector A2-B2/B2-A2 170 monitors Clock Signal A2 and Clock Signal B2, and sends a signal to Synchronizer A2 140 or Synchronizer B2 144 if necessary to delay the clock signal which is leading the other.

A clock pair is a set of two Clock Signals which have been synchronized with each other to produce complementary Synchronized Clock Signals. Therefore, one clock pair consists of two complementary clock signals. For instance, the pair of Synchronized Clock Signals including Synchronized Clock Signal A1-B1 148 and Synchronized Clock Signal B1-A1 156 are referred to as the A1-B1/B1-A1 clock pair. Thus, four clock pairs comprising four Synchronized Clock Signals and their complements (eight Synchronized Clock Signals total) are produced by the four sets of Clock Signals. FIG. 6 shows the four sets of clock pairs at the outputs of the synchronizers. The four sets of clock pairs are A1-A2/A2-A1 (comprising Synchronized Clock Signals A1-A2 146 and A2-A1 150), A1-B1/B1A1 (comprising Synchronized Clock Signals A1-B1 148 and B1-A1 156), B1-B2/B2-B1 (comprising Synchronized Clock Signals B1-B2 154 and B2-B1 158), and A2-B2/B2-A2 (comprising Synchronized Clock Signals A2-B2 152 and B2-A2 160).

All four of the clock pairs are available at the output of the synchronizers whenever voltage is supplied to both power domains. Therefore, there must be a method of selecting a clock pair to distribute the clock signals to the loads in the power domains. This is performed via the Select #1 172, Select #2 174, Select #3 176, and Select #4 178 circuits. These circuits provide a multiplexer-type function, and allow a specified clock pair to pass to Clock Distribution Circuitry A 162 and Clock Distribution Circuitry B 180 at the direction of the Network Interface Modules (NIM) A 182 and B 184. The NIMs provides a user interface for clock pair changes desired by the user. Automatic clock pair changes are also possible when error detection circuitry indicates clock signal errors to the NIMs. The error detection circuitry of the present invention includes Skew Fault Detection A 186 and B 188. This error detection circuit is discussed in a later portion of this description.

NIM circuits, such as NIM A 182 and B 184, reside in each power domain which houses a Clock Source, such as Clock Source A 40 and B 42. In other words, a NIM will not be present in power domains which only house additional circuit loads. The capability of the clock distribution system to provide clock signals to additional loads is described in a later portion of this description. One of the two NIM circuits acts as a master controller, while the other acts as a slave controller. Three control signals are provided from the master NIM to each of the Select circuits to enable one of the three Synchronized Clock Signals. There are also three signals provided from the NIM to each of the Select circuits to enable one of three synchronization (SYNC) signals (not shown). A SYNC signal is a periodic pulse which is sent to the synchronization circuitry to determine whether or not the two Clock Signals are synchronized. A SYNC signal is created at the Primary Clock Signal Drive A 106 and at the Redundant Clock Signal Drive A 108 of Clock Source A 40. A SYNC signal is also created at the Primary Clock Signal Drive B 110 and at the Redundant Clock Signal Drive B 112 of Clock Source B 42. Synchronizers A1 138, A2 140, B1 142, and B2 144 use these SYNC signals to help synchronize the Clock Signals. The SYNC signals are also sent to each load in the system to produce multiple phases of the clock signal, which in turn are used because certain circuits within each load require offset phases for timing purposes. The SYNC signal which is selected will always be derived from the Clock Signals which comprise the selected clock pair. In other words, if clock pair A1-B1/B1-A1 (comprising Synchronized Clock Signals A1-B1 148 and B1-A1 156) is selected by Select #1 179 and Select #3 176 respectively to clock Load A 48 and Load B 50, then a SYNC signal which is derived from the Primary Clock Signal Drive A 106 in Clock Source A 40 is sent to Synchronizer A1 138 and Load A 48, and a SYNC signal which is derived from the Primary Clock Signal Drive B 110 in Clock Source B 49 is sent to Synchronizer B1 149 and Load B 50. These SYNC signals are only required as a result of the specific synchronizer utilized in the preferred embodiment, and due to the preferred use of a multiple phase clock signal at the loads. Many different types of synchronizers are known in the prior art, and the specific SYNC signal used in the preferred embodiment would not be required in those synchronizers.

There are six signals sent from the master and slave NIM to each of the Select circuits (24 signals total) to enable the desired Synchronized Clock Signal and SYNC signal to pass to Clock Distribution Circuitry A 162 and Clock Distribution Circuitry B 180. Any type of selection circuitry could be used to select the desired signals, and in the preferred embodiment each of the 24 signals is ANDed with one of the 24 Clock Signals or SYNC signals to allow the desired signal to pass to the Clock Distribution Circuitry A 162 and B 180. The master NIM A 182 or B 184 selects particular signals depending upon whether an error has occurred, or whether a request was made by User Interface A 190 or B 192 to switch to a new clock pair.

FIG. 6 shows that some of the Synchronized Clock Signals are connected to more than one Select circuit. Synchronized Clock Signal A1-B1 148 and its complement Synchronized Clock Signal B1-A1 156, and Synchronized Clock Signal A2-B2 152 and its complement Synchronized Clock Signal B2-A2 160 are each connected to one Select circuit within its power domain, and to one Select circuit in the other power domain. Synchronized Clock Signal A1-B1 is connected to Select #1 172 and Select #4 178, Synchronized Clock Signal A2-B2 is connected to Select #1 and Select #4, Synchronized Clock Signal B1-A1 is connected to Select #2 174 and Select #3 176, and Synchronized Clock Signal B2-A2 is connected to Select #2 and Select #3. This is to provide alternate routes for Clock Signals which are synchronized with a Clock Signal from the other power domain. If a problem occurs with one of the two available Select circuits connected to a Synchronized Clock Signal, the Clock Distribution Circuitry A 162 or B 180 will recognize the loss of the Synchronized Clock Signal to its Primary A 194 or B 196 input, and will automatically switch to the alternate Select circuit which will supply the Synchronized Clock Signal to the Secondary A 198 or Secondary B 200 input. For example, if Select #1 became unavailable or failed for any reason, Clock Distribution Circuitry A's 162 Primary A 194 input would recognize the loss of the Synchronized Clock Signal A1-B1 148 input, and would switch so that the Secondary A 198 input which is connected to Select #4 178 would receive the Synchronized Clock Signal A1-B1 148.

Figure 9:
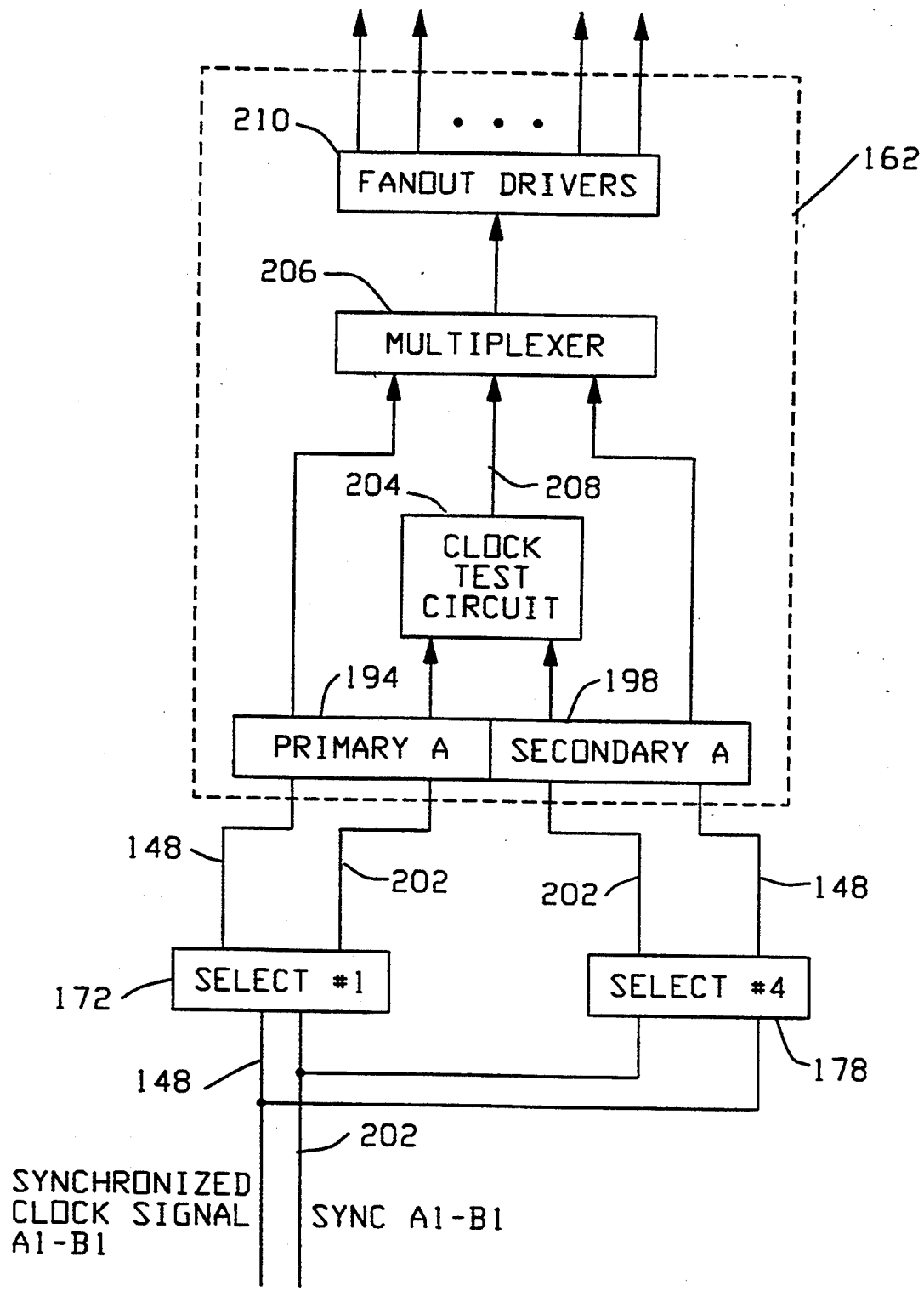
FIG. 9 is a block diagram of the method of selecting a Synchronized Clock Signal through the Primary A or the Secondary A input of the Clock Distribution Circuitry A.

FIG. 9 is a block diagram of the method of selecting a Synchronized Clock Signal through the Primary A 194 or the Secondary A 198 input of the Clock Distribution Circuitry A 162. Clock Distribution Circuitry A will be used in this example, but the same description applies to Clock Distribution Circuitry B 180 or other additional Clock Distribution Circuits. Select #1 172 and Select #4 178 are connected to the Primary A 194 and Secondary A 198 inputs respectively of Clock Distribution Circuitry A. As shown in FIG. 6, Select #4 is the alternate Select circuit for the Synchronized Clock Signal A1-B1 148. The Select circuits each provide the Synchronized Clock Signal and a SYNC signal to the Clock Distribution Circuitry. The SYNC signals were briefly discussed previously. A SYNC signal is generated by the same oscillators that generate the clock signals, and a SYNC signal has a waveform in which a pulse occurs every eighth cycle of a Synchronized Clock Signal pulse. These SYNC signals, labelled SYNC A1-B1 202 in this example, are connected through the Primary A 194 and Secondary A 198 inputs to the Clock Test Circuit 204. Synchronized Clock Signal A1-B1 148 is connected through the Primary A input and Select #1 172 to the Multiplexer 206, and is also connected through the Secondary A input and Select #4 178 to the Multiplexer. The output of the Clock Test Circuit, labelled Test Circuit Output 208, is a control signal connected to the Multiplexer to indicate which input path of the Synchronized Clock Signal A1-B1 148 should be selected to drive the circuit loads. The selected input path at the Multiplexer output is driven to these circuit loads through the Fanout Drivers 210.

Synchronized Clock Signal A1-B1 148 at the Primary A 194 input is the default signal which is selected by the Multiplexer 206 in response to the Clock Test Circuit 204 upon power up of Power Domain A 10, or upon a reset of the Clock Distribution Circuitry A 162. The Clock Test Circuit will continue to indicate to the Multiplexer 206 to select Synchronized Clock Signal A1-B1 148 from the Primary A 194 input until the Clock Test Circuit determines that a problem with Synchronized Clock Signal A1-B1 has occurred. At that time, the Clock Test Circuit will switch the logic state of the Test Circuit Output 208 so that the Multiplexer 206 will select Synchronized Clock Signal A1-B1 148 from the Secondary A 198 input to drive the circuit loads. Therefore, if Synchronized Clock Signal A1-B1 148 becomes unavailable or the Select #1 172 circuit fails, the Synchronized Clock Signal A1-B1 148 will be selected at Select #4 178, and the Clock Test Circuit 204 will select the Secondary A 198 input to drive the circuit loads.

Figure 10:
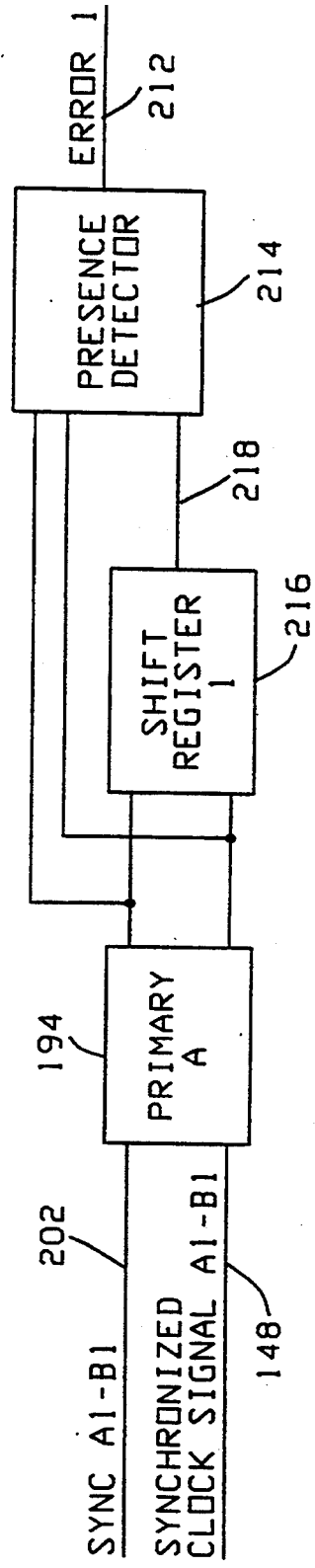
FIG. 10 is a block diagram of the first test performed by the Clock Test Circuit.

FIG. 10 is a block diagram of the first test performed by the Clock Test Circuit 204. This test is performed for each of the Synchronized Clock Signals at the Primary A 194 and Secondary A 198 inputs, but will only be described with respect to Synchronized Clock Signal A1-B1 148. It should be noted that this test is performed at both the Primary A 194 and Secondary A 198 inputs, and the Synchronized Clock Signal used will depend upon which Synchronized Clock Signal was chosen by the Select circuits.

A detected error of the first test, labeled Error 1 212, occurs when the Presence Detector 214 determines that each phase produced by Shift Register 1 216 occurs at a predetermined time relative to the SYNC A1-B1 202 signal. The Synchronized Clock Signal A1-B1 148 is the clock signal for the logic in both the Shift Register 1 216 and the Presence Detector 214. The Shift Register Output 208 consists of eight shifted outputs. An error on Error 1 202 will cause the Test Circuit Output 208 to switch logic states, which will indicate to the Multiplexer 206 to select Synchronized Clock Signal A1-B1 148 from the Secondary A 198 input to drive the circuit loads.

Figure 11:
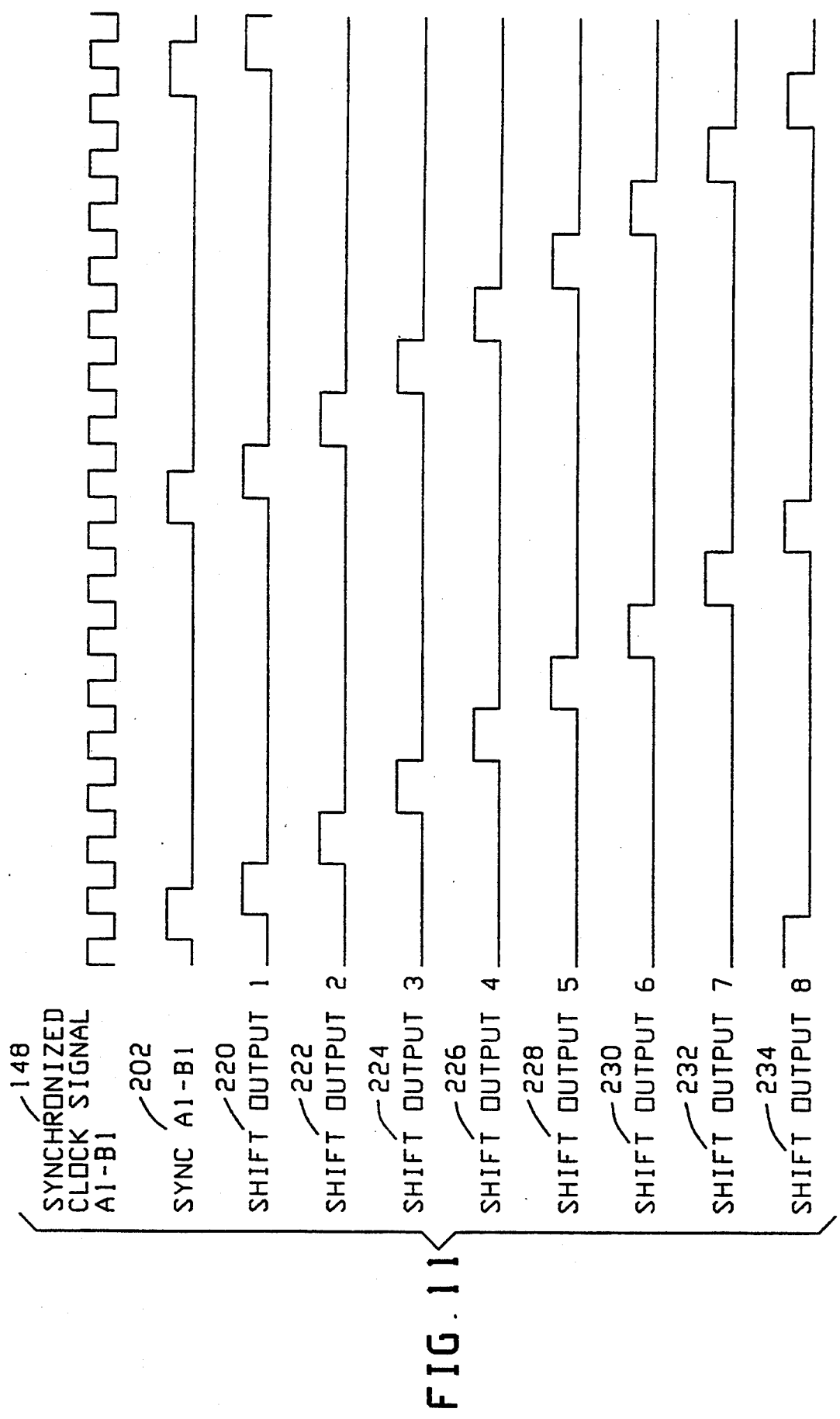
FIG. 11 is a waveform diagram of the output of Shift Register 1 is the Clock Test Circuit.

FIG. 11 is a waveform diagram of the output of Shift Register 1 216 in the Clock Test Circuit 204. Referring to FIG. 10 and FIG. 11, it can be seen that the Shift Register Output 218 of Shift Register 1 216 consists of eight shifted outputs, labelled Shift Output 1 220, Shift Output 2 222, Shift Output 3 224, Shift Output 4 226, Shift Output 5 228, Shift Output 6 230, Shift Output 7 232, and Shift Output 8 234. These shifted outputs are then compared to the SYNC A1-B1 202 to determine whether the particular shifted output is present when it should be, and is absent when it should be. For instance, the present design requires that Shift Output 1 220 or Shift Output 8 234 be a logic high when the SYNC A1-B1 202 is a logic high. Accordingly, Shift Output 2 through Shift Output 7 must be a logic low when the SYNC A1-B1 202 is a logic high. The Presence Detector 214 performs this comparison, and this type of comparison is obvious to one skilled in the art. If the Presence Detector determines that Shift Output 1 or Shift Output 8 is absent when it should be present, this will indicate that the SYNC A1-B1 202 is not present at the Primary A 194 input, and the Error 1 212 will cause the Clock Test Circuit 204 to switch the logic state of the Test Circuit Output 208 so that the Multiplexer 206 will select Synchronized Clock Signal A1-B1 148 from the Secondary A 198 input to drive the circuit loads.

Figure 12:
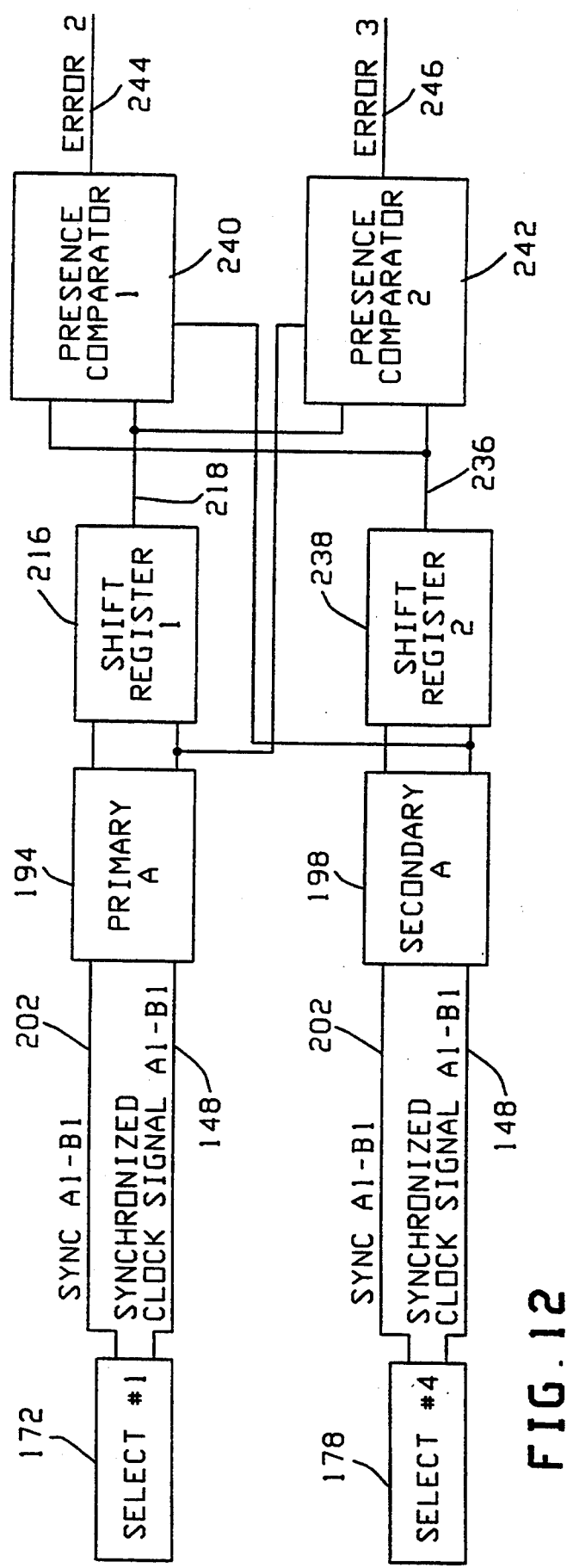
FIG. 12 is a block diagram of the second test performed by the Clock Test circuit.

FIG. 12 is a block diagram of the second test performed by the Clock Test Circuit 204. This test compares the Shift Register Output 218 of Shift Register 1 216 to the Shift Register Output 236 of Shift Register 2 238. The Presence Comparators 1 240 and 2 242 perform the comparison, and produces the signal Error 2 244 or Error 3 246 respectively upon determining that an error has occurred. Select #1 172 and Select #4 178 transmit the SYNC A1-B1 202 signal and the Synchronized Clock Signal A1-B1 148 to Shift Register 1 216 and Shift Register 2 238 respectively. Shift Register 1 accepts the SYNC A1-B1 signal and the Synchronized Clock Signal A1-B1 at the Primary A 194 input, and Shift Register 2 accepts the SYNC A1-B1 signal and the Synchronized Clock Signal A1-B1 at the Secondary A 198 input. Presence Comparator 1 240 and Presence Comparator 2 242 each input Shift Register Output 1 218 and Shift Register Output 2 236, which each consist of eight shifted outputs. Synchronized Clock Signal A1-B1 148 from Select #4 178 clocks Presence Comparator 1 240, while Synchronized Clock Signal A1-B1 148 from Select #1 172 clocks Presence Comparator 2 242.

For this test, the Presence Comparators compare each of the eight shifted outputs to each other. For instance, Shift Output 2 222 (shown in FIG. 11) of Shift Register 1 216 will be compared to Shift Output 2 (not shown) of Shift Register 2 238. If the Presence Comparator determines that one is absent when the other is present, it will issue the associated Error 2 244 signal or the Error 3 246 signal. The Presence Comparators are able to do this because Presence Comparator 1 240 receives its SYNC A1-B1 202 signal from the Primary A 194 input, but is clocked by the Synchronous Clock Signal A1-B1 148 associated with the Secondary A 198 input. Likewise, Presence Comparator 2 242 receives its SYNC A1-B1 202 signal from the Secondary A 198 input, but is clocked by the Synchronous Clock Signal A1-B1 148 associated with the Primary A 194 input. Therefore, if the SYNC A1-B1 202 from Select #1 172 fails to reach the Primary A 194 input, the Presence Comparator 1 240 will detect that the shifted output from Shift Register 1 216 is no longer present, since Presence Comparator 1 will continue to be clocked by the Synchronous Clock Signal A1-B1 148 from the Secondary A 198 input. The same holds true by analogy if the SYNC A1-B1 202 from Select #4 178 fails to reach the Secondary A 198 input. The comparison performed by the Presence Comparators 1 240 and 2 242 is simply a signal-to-signal comparison so that it would be obvious to one skilled in the art.

The alternate paths for clock signals are used only for clock signals which are synchronized with signals from the other power domain. Where clock signals are synchronized with other clock signals from the same power domain, it is possible that the other power domain has not even had voltage applied to it yet, and therefore the Select circuitry from that power domain would not be active. Furthermore, since it is desirable to use Clock Signals from different power domains, two Clock Signals from the same power domain will comprise the active clock pair only where one circuit load is to be utilized, where the system is in initial power up stage, or where multiple oscillators have failed.

For further details concerning the simultaneous synchronization of redundant oscillators used in the preferred embodiment, see copending Patent Application "Redundant Synchronized Clock Controller", Serial No. 08/173,446, filed on Dec. 23, 1993, and assigned to the assignee of this application.

Figure 13A:
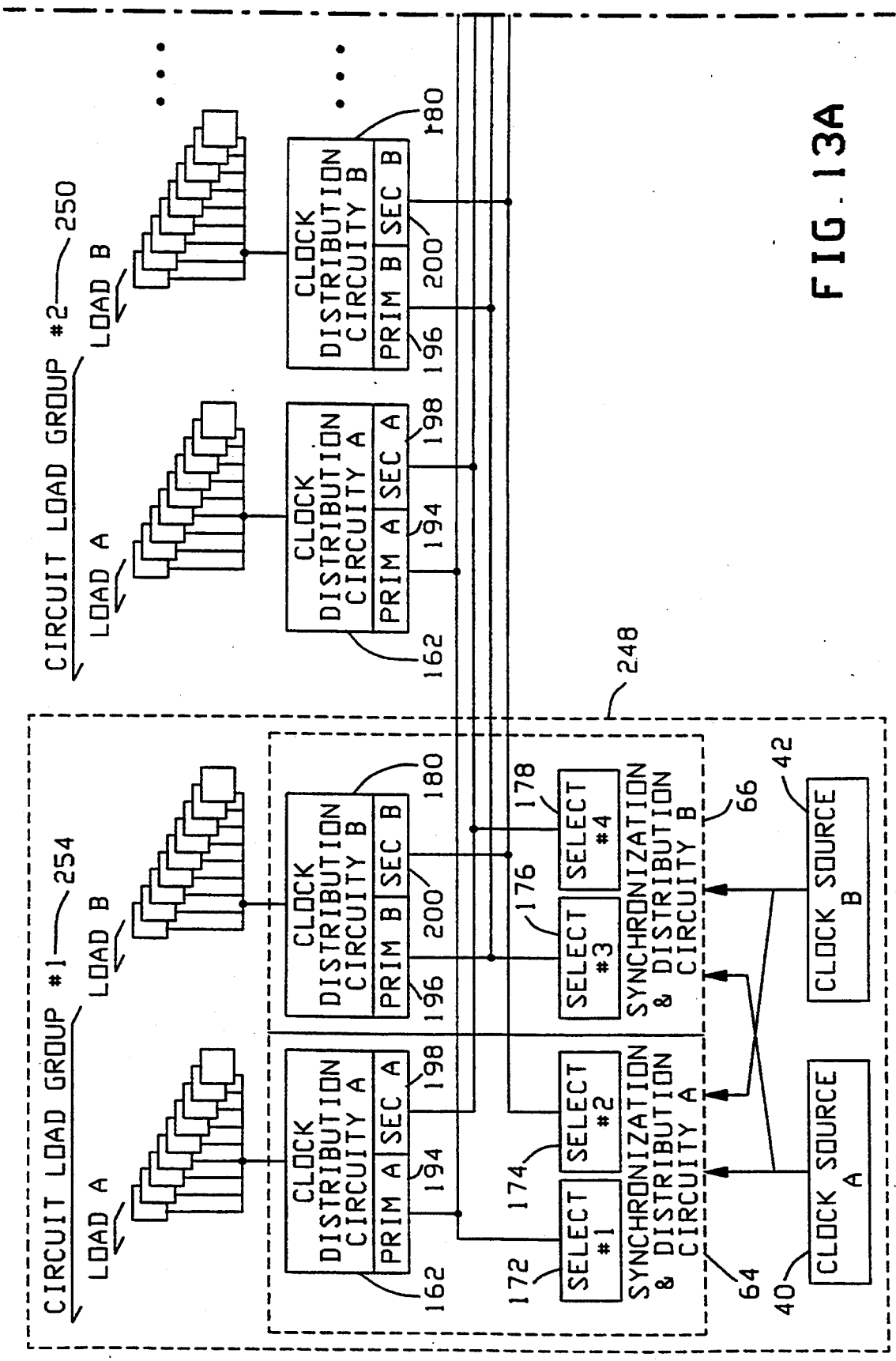
FIG. 13 includes FIG. 13A and FIG. 13B positioned as shown, and is a composite diagram showing the capability of the clock distribution system to clock additional loads.
Figure 13:
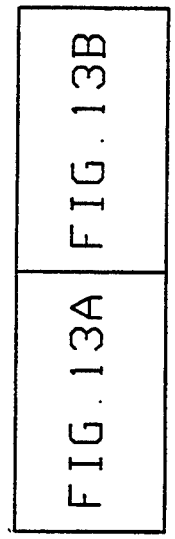
Figure 13B:
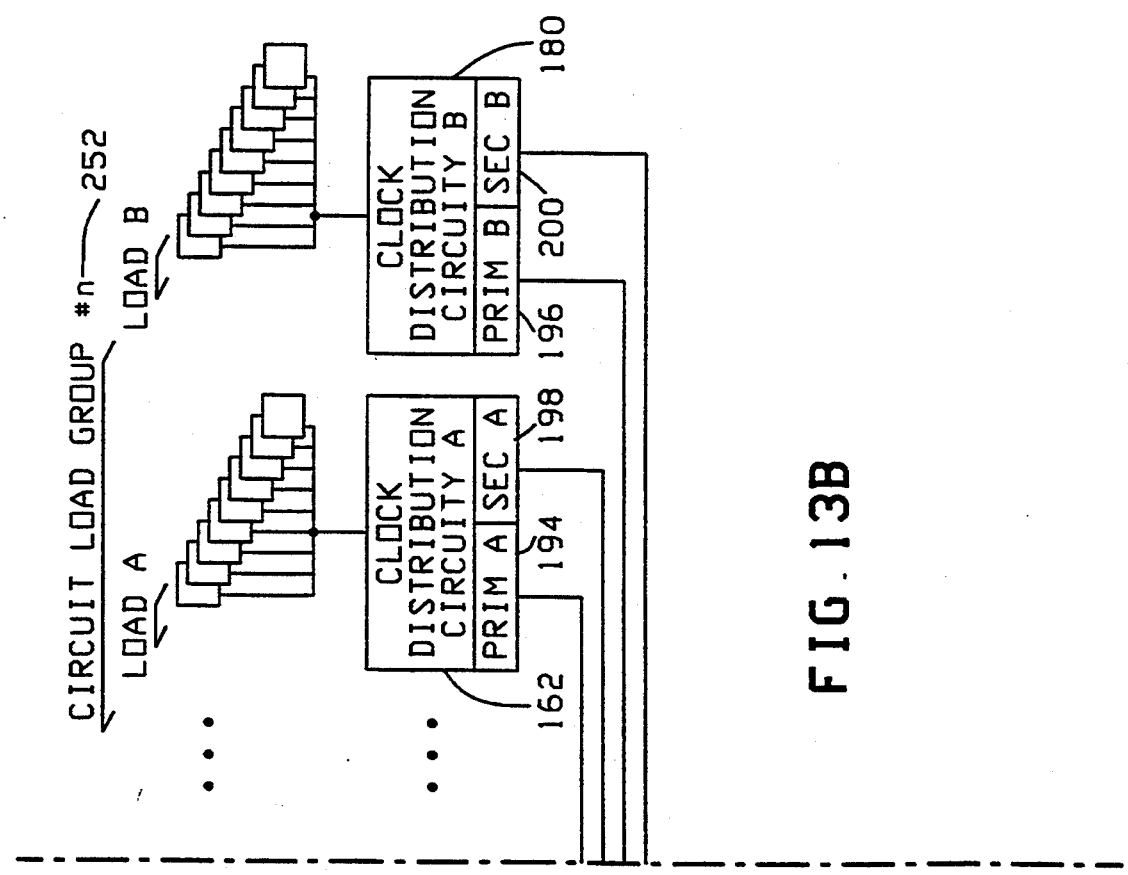

FIG. 13 includes FIG. 13A and FIG. 13B positioned as shown, and is a composite diagram showing the capability of the clock distribution system to clock additional loads. The Clock Module 248 represents the portion of the entire Fault Tolerant Clock Distribution System which has thus far been described. As seen in FIG. 13, additional loads such as Circuit Load Group #2 250 through Circuit Load Group #n 252 may be clocked by the same clock distribution system. Each additional load is connected in parallel with the first load of Circuit Load Group #1 254. Each Primary A 194 in FIG. 13 is connected to the output of Select #1 172. Each Secondary A 198 in FIG. 13 is connected to the output of Select #4 178. Each Primary B 196 in FIG. 13 is connected to the output of Select #3 176. Each Secondary B 200 in FIG. 13 is connected to the output of Select #2 174. In the preferred embodiment, fan-out capabilities exist to clock up to sixteen circuit load groups (thirty-two loads) with the same clock distribution system. Where the loads represent memory and memory control circuitry, this allows for expansion of memory capability without the need for additional clocking circuitry. Each Load and associated Clock Distribution Circuitry outside of the Clock Module 248 will be housed in a separate Power Domain having separate DC Power Sources, but will share the same AC Power Sources that power the Clock Module.

Clock Distribution Circuitry A 162 and Clock Distribution Circuitry B 180 provide two major functions. The first is to provide redundant input selection so that a valid clock signal is recognized even in the event that one of the Select circuits fail. For instance, if Select #1 172 were to fail so that no clock signal input was present at the Primary A 194 input of Clock Distribution Circuitry A 162, Synchronized Clock Signal A1-B1 148 would be present at Secondary A 198 of Clock Distribution Circuitry A through the Select #4 178 circuit. The Clock Distribution Circuitry A must recognize the loss of clock signal input at the Primary A input, and automatically use the clock signal input at the Secondary A input. The second major function of the Clock Distribution Circuitry A 162 and B 180 is to provide the fan-out capability to the respective circuit loads.

Since this clock distribution system requires high fault tolerance, it is necessary to be able to detect failures or synchronization errors of the oscillators. The present invention incorporates an error detection circuit in order to detect synchronization errors, and provides means to switch to operational oscillators. As shown in FIG. 6, the error detection circuit of the present invention is the Skew Fault Detection A 186 and B 188. This error detection circuit resides in Power Domain A 10 and, Power Domain B 12 since those power domains comprise the Clock Module 248. No clock error detection circuits are required in any other power domains which exist only to house additional circuit load groups.

Figure 14:
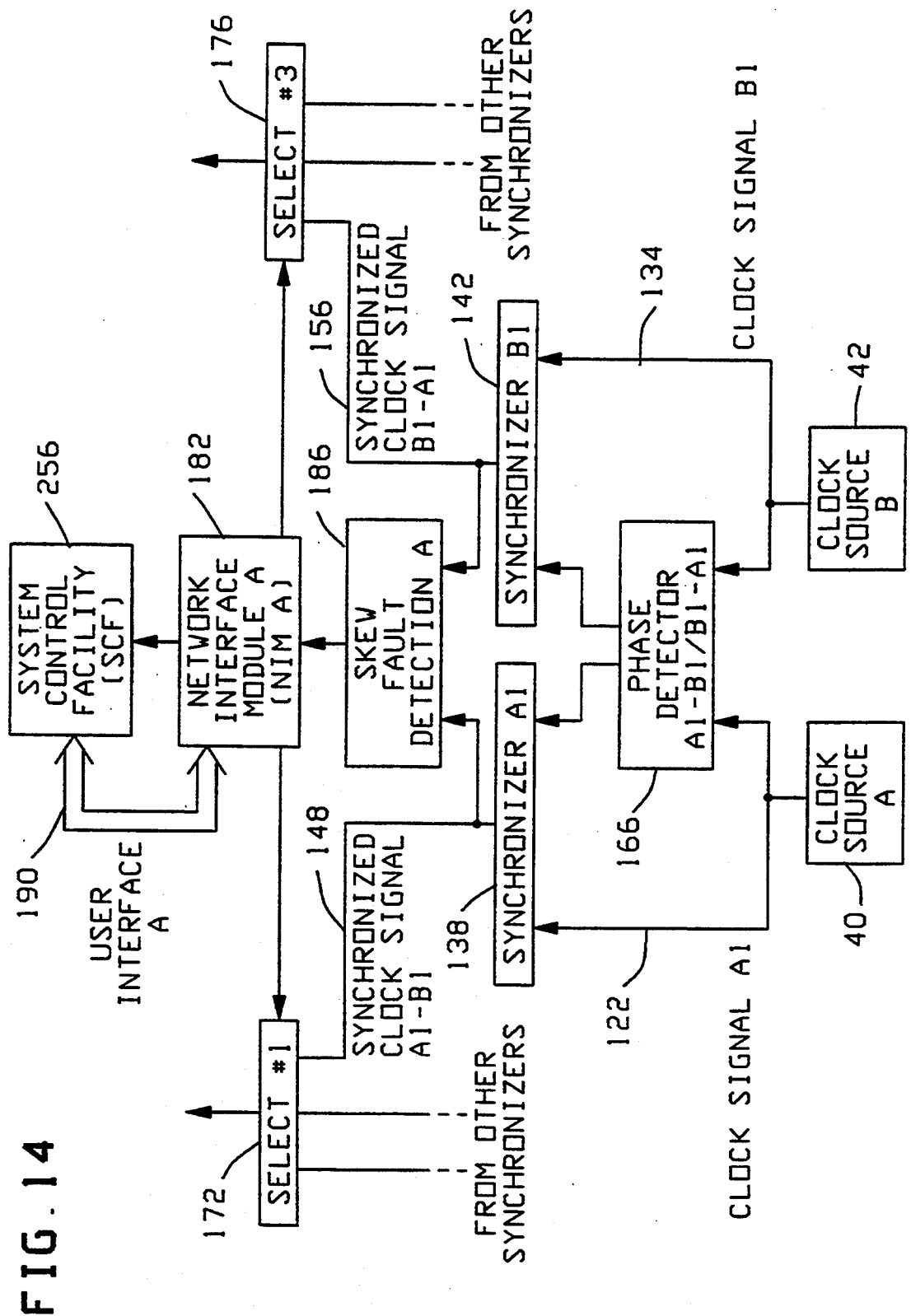
FIG. 14 is a block diagram of the operation of the Skew Fault Detection.

FIG. 14 is a block diagram of the operation of the Skew Fault Detection. A skew fault occurs when the two clock signals which are being monitored are out of phase to the extent that the synchronizers cannot successfully resynchronize them. The Skew Fault Detection A 186 circuitry detects inadmissible phase differentials between the two clock signals, detects which clock signal is faster, and disables the faster of the two. The operation of the Skew Fault Detection A 186 will be described through explanation of skew fault monitoring of Synchronizers A1 138 and B1 142. However, it should be recognized that skew fault monitoring occurs for multiple pairs of synchronizers in the system, and the operation of skew fault monitoring for the other pairs of synchronizers is analogous to the forthcoming description.

As shown in FIG. 14, the inputs of the Skew Fault Detection A 186 are the Synchronized Clock Signals A1-B1 148 and B1-A1 156 which are generated by Synchronizer A1 138 and Synchronizer B1 142 respectively. As previously described, Clock Signal A1 122 and Clock Signal B1 134 are monitored by Phase Detector A1-B1/B1-A1 166, which in turn sends resynchronization requests to the synchronizers if the two Clock Signals are not synchronized. Synchronizer A1 138 will delay Clock Signal A1 122 for a short time if Clock Signal A1 is oscillating faster than Clock Signal B1 134. Synchronizer B1 142 will delay Clock Signal B1 134 for a short time if Clock Signal B1 is oscillating faster than Clock Signal A1. When the two clock signals are presumably resynchronized, they are monitored by the Skew Fault Detection A 186 to ensure that Synchronizers A1 138 and B1 142 have successfully resynchronized the out-of-phase clock signals. Therefore, the Skew Fault Detection A ensures that the Synchronizers are working properly and that they can maintain synchronization of the two clock signals. Skew Fault Detection is desirable in a multiple oscillator clock distribution system so that an operational clock pair may be selected if the currently active clock pair is no longer staying properly synchronized.

If the Skew Fault Detection circuitry establishes that the clock signals which are outputted by Synchronizer A1 138 and Synchronizer B1 142 are not properly synchronized, a skew fault will occur. This error signal is sent to the Network Interface Module A (NIM A) 182, and a skew fault error message is sent to the System Control Facility (SCF) 256. The NIM A will disable both Synchronized Clock Signal A1-B1 148 and Synchronized Clock Signal B1-A1 156, and will enable a new pair of synchronized clock signals to drive the circuit loads through the Select #1 172 and Select #3 176 circuits. The selection of a new clock pair is done either automatically, or manually through the User Interface A 190, depending on which mode the NIM A has been set to. To reduce the chance of faulty Skew Fault Detection circuitry causing the system to switch to a new clock pair, multiple skew detectors are used, and a voting scheme is used which requires at least two skew faults to be present before a skew fault will be acknowledged. For further details concerning the skew detection, see copending Patent Application "Skew Fault Detection and Sync Disable", Serial No. 08/148,246, filed on Dec. 23, 1993, and assigned to the assignee of this application.

The clock signals which are distributed to the circuit loads in this design are "single phase" clock signals, i.e., only a single "pulse train" is provided. It may be desirable to provide multiple phases at the load so that latches, registers, and other timed activities can be set or cleared at the occurrence of a particular pulse of the clock signal relative to another pulse of the clock signal. For example, during a period of four pulses of a clock signal, it may be desired to set one level of registers on the first pulse of the four-period interval, and to set another level of registers on the third pulse of the four-period interval. To accomplish this, a clock distribution system may generate four phases at the clock source circuitry, and distribute all four phases to the load circuitry. The present invention does not generate multiple phases at the clock source circuitry however. Due to the use of multiple oscillators for purposes of redundancy, it would be complicated and problematic to detect phase differentials and to synchronize multiple phases of multiple oscillators. For example, the present invention utilizes four oscillators which are simultaneously synchronized, and if a four-phase clock were generated from the selected Synchronized Clock Signal, then four signals must be controlled during distribution to the circuit loads. In order to avoid this situation, the clock distribution system of the preferred embodiment does not generate multiple phases at the clock source circuitry, but rather generates multiple phase enables from the single phase clock at the load itself. In this way, only one phase of each Clock Signal A1 122, A2 124, B1 134, and B2 136 requires synchronization and distribution, and the circuit loads themselves are enabled to receive the single phase clock.

Figure 15:
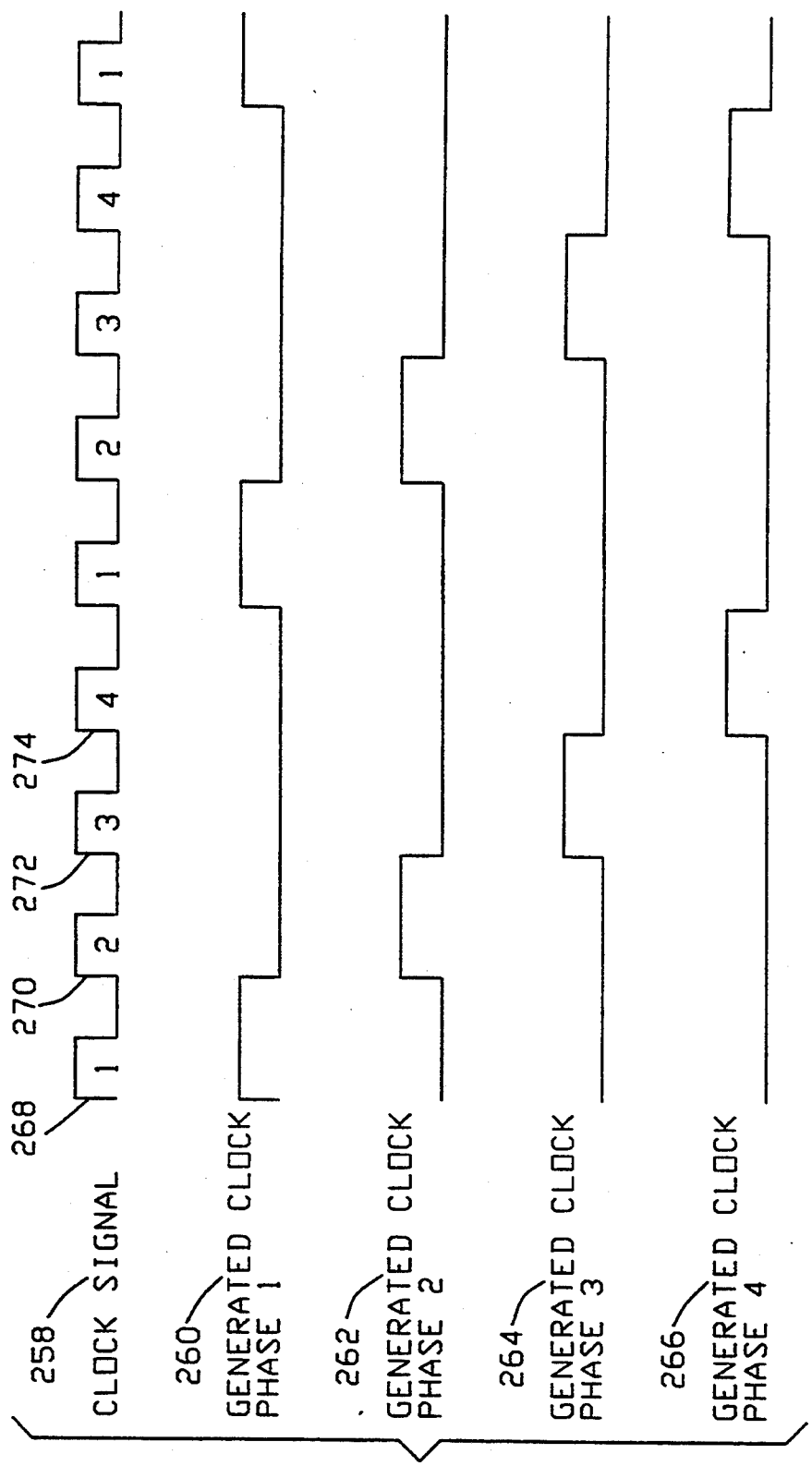
FIG. 15 shows a waveform diagram of the single phase clock and the multiple phases which are produced at each load.

FIG. 15 shows a waveform diagram of the single phase clock and the multiple phases which are produced at each circuit load. As seen from the diagram, four phases are constructed at the load from the single phase generic Clock Signal 258. Each of the Generated Clock Phases 1 260, 2 262, 3 264, and 4 266 consists of a high pulse of duration equal to one period of the Clock Signal 258. The pulses repeat every fourth pulse of the Clock Signal. Generated Clock Phase 1 260 switches to an active high at the rising edge of Pulse 1 268 of the Clock Signal. Generated Clock Phase 2 262 switches to an active high at the rising edge of Pulse 2 270 of the Clock Signal. Generated Clock Phase 3 264 switches to an active high at the rising edge of Pulse 3 272 of the Clock Signal. Generated Clock Phase 4 266 switches to an active high at the rising edge of Pulse 4 274 of the Clock Signal. The use of the four-phase clock allows particular circuits within each load to be clocked at specific pulses of the single phase Clock Signal 2B8. For further details concerning the method by which the single phase clock provides a four phase clock at the circuit loads using multiple phase enables, see copending Patent Application "Multiple Interval Single Phase Clock", Serial No. 08/173,733, and assigned to the assignee of this application.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A fault tolerant clock distribution system for use in systems requiring redundant synchronized clock signals to ensure continued clocking of circuit loads upon partial failure of the clock distribution system, the clock distribution system comprising:

a plurality of electrically isolated power domains, wherein each said power domain includes a power distribution system for providing voltage to all circuitry within its respective one of said power domains;

a plurality of voltage receiving means, one of said plurality of voltage receiving means in each said power domain, and each connected to said power distribution system within its respective one of said power domains, for coupling a DC voltage corresponding to said voltage to each said power distribution system;

clock signal generating means in each said power domain, for providing a digital clock signal in each said power domain;

clock signal synchronization means in each said power domain, each coupled to said clock signal generating means from its associated power domain, and coupled to said clock signal generating means from each of the other existing power domains, for synchronizing said digital clock signals in one of said power domains to each of said digital clock signals from the other existing power domains, and for providing a synchronized digital clock signal in each said power domain; and clock signal distribution means in each said power domain, each coupled to said clock signal synchronization means in its respective power domain, for distributing said synchronized digital clock signal within its respective power domain.

2. A clock distribution system as in claim 1, wherein the number of said electrically isolated power domains is two.

3. A clock distribution system as in claim 1, wherein each one of said plurality of voltage receiving means from its respective one of said power domains is coupled to a different DC voltage source to allow all remaining said power domains to remain powered up upon the loss of one or more said DC voltage sources.

4. A clock distribution system as in claim 3, wherein each of said DC voltage sources comprises a plurality of DC power supplies, and multiple ones of said plurality of voltage receiving means exist in their respective ones of said power domains in a number equal to the number of said plurality of DC power supplies in each said DC voltage source, and wherein each of said multiple ones of said plurality of voltage receiving means from their respective one of said power domains is coupled to a different one of said DC power supplies to provide DC voltage redundancy to each said power domain to ensure continual DC voltage sourcing to the clock distribution system circuitry.

5. A clock distribution system as in claim 4, further comprising a plurality of AC power sources equal to the number of said DC power supplies in each said DC voltage source, wherein each said AC power source is coupled to one of said DC power supplies in each said DC voltage source to provide AC power redundancy to said DC voltage sources for ensuring continual DC voltage sourcing to the clock distribution system circuitry.

6. For use in systems requiring multiple synchronized clock signals, a fault tolerant clock distribution system having a plurality of redundant oscillators, phase detection circuitry to monitor phase deviation between any given pair of oscillator signals generated by said plurality of redundant oscillators, and synchronizing circuitry responsive to the phase detection circuitry to produce one or more pairs of synchronized clock signals, comprising:

selection control means for generating selection signals to designate one of the pairs of synchronized clock signals to be selected;

clock signal selection means, coupled to said selection control means for receiving said selection signals, and coupled to the synchronizing circuitry for receiving specified ones of the pairs of synchronized clock signals, and for selecting a specific one of the pairs of synchronized clock signals in response to said selection signals; and one or more pairs of clock signal distribution means, each pair of clock signal distribution means coupled to said clock signal selection means, for receiving said specific one of the pairs of synchronized clock signals, and for distributing the two synchronized clock signals comprising said specific one of the pairs of synchronized clock signals to a number of pairs of circuit loads equal to the number of pairs of said clock signal distribution means, one synchronized clock signal to each said circuit load in its respective pair, to simultaneously clock the two circuit loads in each said pair of circuit loads.

7. A fault tolerant clock distribution system as in claim 6, further comprising skew detection means coupled to the synchronizing circuitry and responsive to the pairs of synchronized clock signals and coupled to said selection control means, for detecting an unacceptable phase deviation between the individual synchronized clock signals comprising one of the pairs of the synchronized clock signals, and for indicating the error to said selection control means for automatically designating a functional pair of the synchronized clock signals to be selected by said clock signal selection means.

8. A fault tolerant clock distribution system as in claim 6, further comprising interface means coupled to said selection control means for providing a user interface for manually indicating to said selection control means which of the pairs of synchronized clock signals is to be designated for selection by said clock signal selection means.

9. A fault tolerant clock distribution system as in claim 6, wherein said clock signal selection means is partitioned into separate selection circuits such that each of the synchronized clock signals comprising the pairs of synchronized clock signals is connected to a plurality of said selection circuits, for providing the capability to select individual synchronized clock signals through a primary selection circuit or through alternate selection circuits.

10. A fault tolerant clock distribution system as in claim 9, wherein each said clock signal distribution means includes a plurality of clock signal input means, each said clock signal input means being coupled to one of said selection circuits, for receiving each said individual synchronized clock signal selected, which together comprise said specific one of the pairs of synchronized clock signals, through either said primary selection circuit or one of said alternate selection circuits.

11. A fault tolerant clock distribution system as in claim 10, wherein said clock signal distribution means further includes:

clock signal availability testing means coupled to all said clock signal input means, for monitoring for the presence of said individual synchronized clock signals at each said clock signal input means, and for generating control signals to indicate which of said clock signal input means is to provide said individual synchronized clock signals to their respective circuit loads; and multiplexing means coupled to said clock signal availability testing means, and coupled to each said individual synchronized clock signal selected through said primary selection circuit and said alternate selection circuits, for receiving said control signals and selecting in response thereto one of said clock signal input means to provide said individual synchronized clock signals to their respective circuit loads.

12. A fault tolerant clock distribution system as in claim 6, further comprising phase enable means at the circuit loads, for receiving an individual synchronized clock signal from the pairs of synchronized clock signals, and for generating a plurality of phase enable signals to enable the circuit loads to receive said individual synchronized clock signal only on predetermined pulses of said individual synchronized clock signal.

13. A fault tolerant clock distribution system for providing a plurality of synchronized clock signals for simultaneously clocking a plurality of circuit loads, comprising:

two electrically isolated power domains;

a plurality of redundant digital oscillators in each said power domain for producing a like number of oscillator signals;

a plurality of phase detection circuits in each said power domain, each coupled to two of said digital oscillators to receive two said oscillator signals, for monitoring phase differences between said oscillator signals, and for providing a resynchronization signal upon determining an intolerable phase difference between said oscillator signals;

a plurality of synchronization circuits in each said power domain, each coupled to one of said digital oscillators to receive associated said oscillator signal, and each coupled to one or more said phase detection circuits to receive said resynchronization signals from said phase detectors which are monitoring for phase differences between said oscillator signal and other predetermined oscillator signals, for synchronizing said oscillator signal with other predetermined oscillator signals in response to said resynchronization signals and providing a synchronized oscillator signal;

selection control circuits in each said power domain to generate selection control signals to designate ones of said synchronized oscillator signals to be selected;

a plurality of selection circuits in each said power domain, each coupled to said selection control circuits in their respective ones of said power domains, having selection input terminals to receive said selection control signals, and each coupled to one of said synchronization circuits to receive associated said synchronized oscillator signals, and having selection output terminals to output said designated ones of said synchronized oscillator signals in response to said selection control signals; and clock distribution circuitry in each said power domain coupled to selected ones of said plurality of selection circuits from both of said power domains, having distribution input terminals to receive designated ones of said synchronized oscillator signals, and having distribution output terminals to distribute in response thereto the plurality of synchronized clock signals for simultaneously clocking the plurality of circuit loads, whereby the plurality of synchronized clock signals simultaneously clock redundant circuit loads in different ones of said power domains, so that the loss of power in one said power domain or the failure of the circuit loads within one said power domain does not result in the loss of system data or in the loss of system functionality.

14. A fault tolerant clock distribution system as in claim 13, wherein each one of said plurality of selection circuits in said power domains is coupled to a plurality of said synchronized oscillator signals, for providing the capability to select said designated ones of said synchronized oscillator signals through alternate selection circuits.

15. A fault tolerant clock distribution system as in claim 14, wherein said clock distribution circuitry in each said power domain includes first and second input terminals for receiving said designated ones of said synchronized oscillator signals from said plurality of selection circuits at said first input terminal, and for receiving said designated ones of said synchronized oscillator signals from said alternate selection circuits at said second input terminal upon loss of said designated ones of said synchronized oscillator signals at said first input terminal.

16. A fault tolerant clock distribution system as in claim 13, further comprising skew fault error detection circuitry in each said power domain coupled to said synchronization circuits for receiving said synchronized oscillator signals, and coupled to said selection control circuitry, for detecting an unacceptable phase deviation between said designated ones of said synchronized oscillator signals, and for indicating the error to said selection control circuitry for automatically designating a functional pair of said synchronized oscillator signals to be selected by said selection circuits.

17. A fault tolerant clock distribution system as in claim 13, further comprising phase enable circuitry at the circuit loads to receive the synchronized clock signal, and to generate a plurality of phase enable signals to enable the circuit loads to receive the synchronized clock signal only on predetermined pulses of the synchronized clock signal.

18. A fault tolerant clock distribution system for providing a first synchronized clock signal to a first circuit load, and a second synchronized clock signal to a second circuit load, wherein each of the circuit loads consist of equivalent circuitry and perform equivalent operations simultaneously, the clock distribution system comprising:

a first power domain having a first voltage bus to supply a first voltage to the first circuit load;

a second power domain, electrically isolated from said first power domain, having a second voltage bus to supply a second voltage to the second circuit load;

a first clock signal generator, within said first power domain and powered by said first voltage via said first voltage bus, and having a first clock signal generator output to provide a first digital clock signal;

a second clock signal generator, within said second power domain and powered by said second voltage via said second voltage bus, and having a second clock signal generator output to provide a second digital clock signal;

a first clock signal synchronizer, within said first power domain and powered by said first voltage via said first voltage bus, having a first input to receive said first digital clock signal, and having a second input to receive said second digital clock signal, and having first synchronization circuitry to synchronize said second digital clock signal to said first digital clock signal, and further having a first output terminal to output the first synchronized clock signal to the first circuit load; and a second clock signal synchronizer, within said second power domain and powered by said second voltage via said second voltage bus, having a third input to receive said second digital clock signal, and having a fourth input to receive said first digital clock signal, and having second synchronization circuitry to synchronize said first digital clock signal to said second digital clock signal, and further having a second output terminal to output the second synchronized clock signal to the second circuit load, whereby the first synchronized clock signal clocks the first circuit load at the same time that the second synchronized clock signal clocks the second circuit load, thus maintaining equivalence between the first and second circuit loads.

19. The clock distribution system as in claim 18, further comprising:

a first power source to generate said first voltage, having a first voltage output terminal to output said first voltage;

a second power source to generate said second voltage, having a second voltage output terminal to output said second voltage;

first voltage input terminals, coupled to said first voltage bus and coupled to said first power source, to receive said first voltage; and second voltage input terminals, coupled to said second voltage bus and coupled to said second power source, to receive said second voltage.

20. The clock distribution system as in claim 19, wherein:

said first power source comprises a plurality of first DC power supplies;

said second power source comprises a plurality of second DC power supplies;

said first voltage bus is coupled to a plurality of said first voltage input terminals to receive redundant voltages from respective ones of said plurality of first DC power supplies; and said second voltage bus is coupled to a plurality of said second voltage input terminals to receive redundant voltages from respective ones of said plurality of second DC power supplies.

21. The clock distribution system as in claim 20, further comprising:

an AC input terminal coupled to each of said plurality of first DC power supplies and to each of said plurality of second DC power supplies;

a first AC power source having a first AC output terminal to output a first AC voltage, and coupled to said AC input terminals of first selected ones of said first DC power supplies and coupled to said AC input terminals of second selected ones of said second DC power supplies, to receive said first AC voltage; and a second AC power source having a second AC output terminal to output a second AC voltage, and coupled to said AC input terminals of third selected ones of said first DC power supplies and coupled to said AC input terminals of fourth selected ones of said second DC power supplies, to receive said second AC voltage.

* * * * *